(12) United States Patent
Dixit

(10) Patent No.: US 11,995,870 B2
(45) Date of Patent: May 28, 2024

(54) DYNAMIC IMAGE COMPRESSION BASED ON PERCEIVED VIEWING DISTANCE

(71) Applicant: Citrix Systems, Inc., Fort Lauderdale, FL (US)

(72) Inventor: Pawan Kumar Dixit, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 188 days.

(21) Appl. No.: 16/752,993

(22) Filed: Jan. 27, 2020

(65) Prior Publication Data

US 2021/0233279 A1 Jul. 29, 2021

(51) Int. Cl.
*G06T 9/00* (2006.01)

(52) U.S. Cl.
CPC ..................... *G06T 9/00* (2013.01)

(58) Field of Classification Search
CPC ............ G06T 9/00; H04N 19/00; H03M 1/00
See application file for complete search history.

(56) References Cited

U.S. PATENT DOCUMENTS

| | | | | |
|---|---|---|---|---|
| 2012/0155769 A1* | 6/2012 | Yokomitsu | ........... | H04N 19/124 382/173 |
| 2015/0016734 A1* | 1/2015 | Igarashi | ................. | H04N 19/42 382/232 |
| 2015/0062132 A1* | 3/2015 | Chann | ..................... | A63F 13/60 345/473 |
| 2017/0123750 A1* | 5/2017 | Todasco | ................... | G06F 21/10 |
| 2019/0371073 A1* | 12/2019 | Harviainen | ............ | G06F 3/011 |

OTHER PUBLICATIONS

Related U.S. Appl. No. 16/122,461, filed Sep. 5, 2018.

* cited by examiner

*Primary Examiner* — Yanna Wu

(57) ABSTRACT

An important aspect of augmented reality (AR) is that digital information, such as rendered images of AR scenes and objects, are integrated with the user's view of the real world in real time. However, transmitting large images over the network may negatively impact the real time aspect of the AR experience. Methods and systems for dynamic image compression based on perceived viewing distance are described herein. In some implementations, image compression of streaming AR content is based on real world distances of AR objects relative to a user or client device. In some implementations, image compression of streaming AR content is based on relative depth information. In some implementations, image compression of streaming AR content is based on a type of information or content associated with an AR object. The dynamic image compression based on perceived viewing distance provided by the systems and methods disclosed herein may also be applied to video codecs.

15 Claims, 22 Drawing Sheets

DYNAMIC IMAGE COMPRESSION BASED ON PERCEIVED VIEWING DISTANCE

FIELD

Aspects described herein generally relate to dynamic image compression, and hardware and software related thereto. More specifically, one or more aspects described herein provide systems and methods for dynamic image compression of virtual reality (VR) or augmented reality (AR) objects and scenes utilizing real world distance information, relative depth information, and a type of content represented by the AR/VR objects.

BACKGROUND

Augmented Reality (AR) content may include superimposing or overlaying images of AR objects (also referred to as "virtual objects") or scenes onto a user's view of a real world environment, thus altering or enhancing the user's perception of the real world environment. The overlay of the virtual objects or scenes may be performed in real time as input of the real world environment is received and captured via a camera on an AR client device, such as a smartphone, tablet, head-mounted display (HMD), AR smart glasses, or smart lenses. The user may place and/or move the virtual objects within the real world scene. AR software applications may utilize models of virtual objects. For example, when an AR software application requests a virtual object to be shown in the real world scene, a model of the virtual object may be rendered locally on the client device, and the rendered bitmaps may be drawn, painted, or shown on top of the user's view of the real world. Thus, the user may both see the real world and also interact with its virtual content in real time.

An AR object or scene may be registered to the real world in a three dimensional (3D) manner. For example, the real world environment may include points or locations identified by markers or trackers like infrared, laser, UPS, or sensors. Virtual objects or scenes may be overlaid on to the real world scene at these points or locations. AR applications may draw or display bitmaps of virtual objects on top of the camera's view of the real world and move the drawn or displayed bitmaps according to the camera's movement in order to create an illusion of a virtual object being present at a location within the real world environment. This may generally be done using Simultaneous Localization and Mapping ("SLAM") to build a map of reliable feature points and continuously tracking the feature points so the virtual object remains placed at a certain location in the real world as the user or camera moves.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards dynamic image compression of streaming AR/VR content based on perceived viewing distance.

According to one aspect, the disclosure relates to a method that includes receiving, by a server, a request for a rendered image of augmented reality (AR) content. The AR content comprises a first AR object and the request comprises a real world distance between a client device and a real world location corresponding to an intended placement location of the first AR object within a real world scene captured by the client device. The method includes rendering, by the server and based on receiving the request, an image corresponding to the AR content. The one or more portions of the image correspond to the first AR object. The method includes selecting, by the server, a first compression factor for the first AR object, wherein the first compression factor is selected from a plurality of compression factors based on the real world distance between the client device and the real world location corresponding to the intended placement location of the first AR object. The method includes compressing, by the server, the image corresponding to the AR content. The one or more portions of the image corresponding to the first AR object are compressed based on the first compression factor. The method includes sending, by the server, the compressed image corresponding to the AR content for delivery to the client device.

According to another aspect, the disclosure relates to a system that includes one or more processors, and a memory storing computer-readable instructions. The computer-readable instructions, when executed by the one or more processors, configure the one or more processors to receive a request for a rendered image of augmented reality (AR) content. The AR content comprises a first AR object and the request comprises a real world distance between a client device and a real world location corresponding to an intended placement location of the first AR object within a real world scene captured by the client device. The one or more processors are also configured to render, based on receiving the request, an image corresponding to the AR content, wherein one or more portions of the image correspond to the first AR object. The one or more processors are configured to select a first compression factor for the first AR object. The first compression factor is selected from a plurality of compression factors based on the real world distance between the client device and the real world location corresponding to the intended placement location of the at least one AR object. The one or more processors are configured to compress the image corresponding to the AR content. The one or more portions of the image corresponding to the first AR object are compressed based on the first compression factor, and send the compressed image corresponding to the AR content for delivery to the client device.

According to another aspect, the disclosure relates to transitory machine readable storage medium comprising machine-readable instructions for causing a processor to execute a method that includes receiving, by a server, a request for a rendered image of augmented reality (AR) content. The AR content comprises a first AR object and the request comprises a real world distance between a client device and a real world location corresponding to an intended placement location of the first AR object within a real world scene captured by the client device. The method includes rendering, by the server and based on receiving the request, an image corresponding to the AR content, wherein one or more portions of the image correspond to the first AR object. The method includes selecting, by the server, a first compression factor for the first AR object, wherein the first compression factor is selected from a plurality of compression factors based on the real world distance between the client device and the real world location corresponding to the intended placement location of the first AR object. The method includes compressing, by the server, the image corresponding to the AR content, wherein the one or more portions of the image corresponding to the first AR object are compressed based on the first compression factor. The method includes sending, by the server, the compressed image corresponding to the AR content for delivery to the client device.

According to another aspect, the disclosure relates to a method that includes receiving, by a server, a request for a rendered image of an AR scene comprising one or more AR objects. The request comprises a real world distance between a client device and an intended placement location of the AR scene within a real world scene captured by a client device. The method includes rendering, by the server and based on receiving the request, an image of the AR scene. The method includes determining, by the server and based on a real world distance between a client device and an intended placement location of the AR scene, relative depth information for one or more portions of the one or more AR objects. The method includes determining, by the server and based on the relative depth information for the one or more AR objects, an average depth for one or more portions of the image. The method includes selecting, by the server, one of a plurality of compression factors for each of the one or more portions of the image based on the average depth determined for the portion. The method includes compressing, by the server, the image of the AR scene. The one or more portions of the image are each compressed based on the compression factor selected for the portion. The method includes sending, by the server, the compressed image of the AR scene for delivery to the client device.

According to another aspect, the disclosure relates to a system that includes one or more processors, and a memory storing computer-readable instructions. The computer-readable instructions, when executed by the one or more processors, configure the one or more processors to receive a request for a rendered image of an AR scene comprising one or more AR objects. The request comprises a real world distance between a client device and an intended placement location of the AR scene within a real world scene captured by a client device. The one or more processors are also configured to render, based on receiving the request, an image of the AR scene. The one or more processors are also configured to determine, based on a real world distance between a client device and an intended placement location of the AR scene, relative depth information for one or more portions of the one or more AR objects. The one or more processors are also configured to determine, based on the relative depth information for the one or more AR objects, an average depth for one or more portions of the image. The one or more processors are configured to select one of a plurality of compression factors for each of the one or more portions of the image based on the average depth determined for the portion. The one or more processors are configured to compress the image of the AR scene. The one or more portions of the image are each compressed based on the compression factor selected for the portion, and send the compressed image of the AR scene for delivery to the client device.

According to another aspect, the disclosure relates to transitory machine readable storage medium comprising machine-readable instructions for causing a processor to execute a method that includes receiving, by a server, a request for a rendered image of an AR scene comprising one or more AR objects. The request comprises a real world distance between a client device and an intended placement location of the AR scene within a real world scene captured by a client device. The method includes rendering, by the server and based on receiving the request, an image of the AR scene. The method includes determining, by the server and based on a real world distance between a client device and an intended placement location of the AR scene, relative depth information for one or more portions of the one or more AR objects. The method includes determining, by the server and based on the relative depth information for the one or more AR objects, an average depth for one or more portions of the image. The method includes selecting, by the server, one of a plurality of compression factors for each of the one or more portions of the image based on the average depth determined for the portion. The method includes compressing, by the server, the image of the AR scene. The one or more portions of the image are each compressed based on the compression factor selected for the portion. The method includes sending, by the server, the compressed image of the AR scene for delivery to the client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
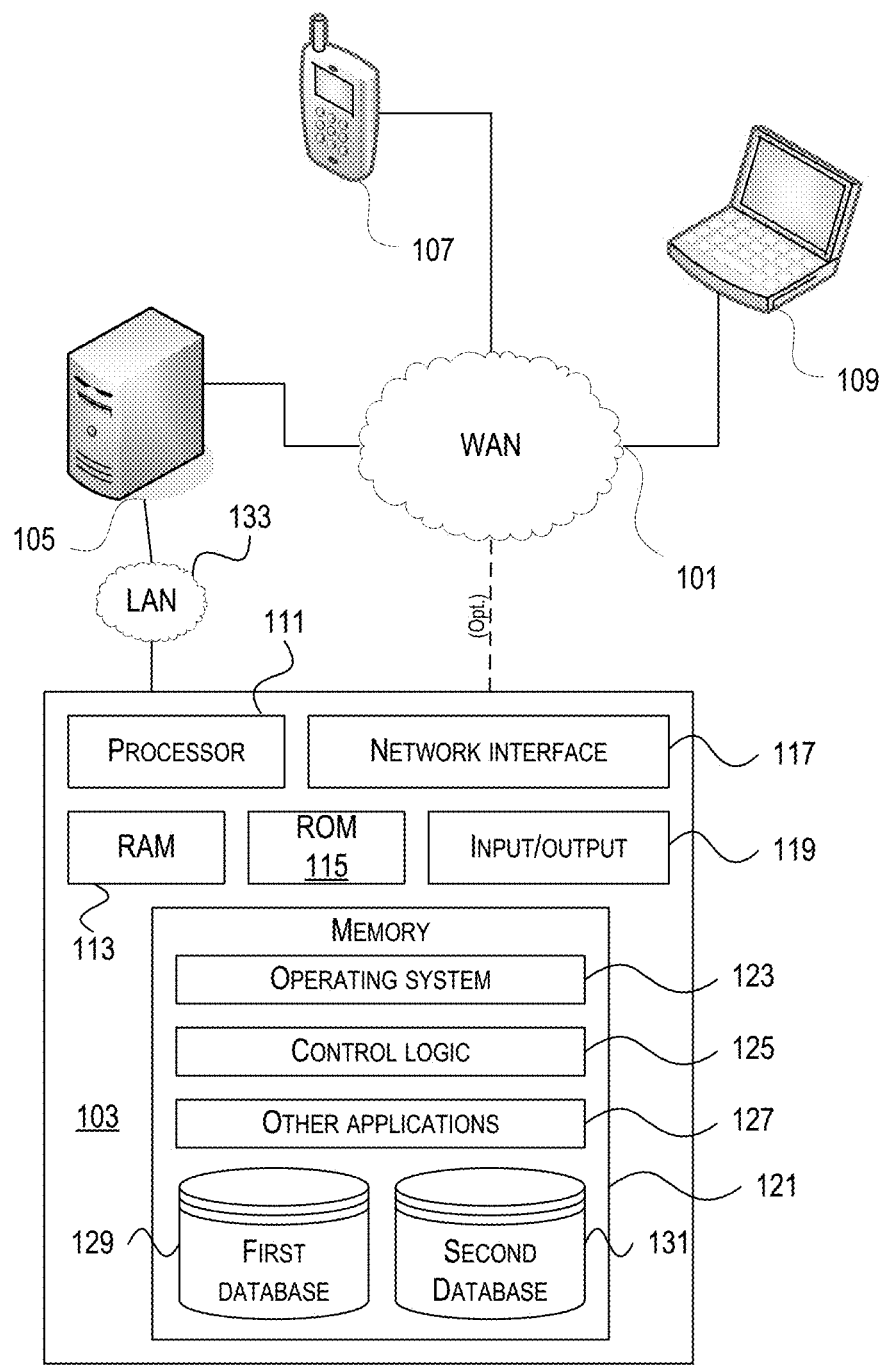
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards dynamic image compression based on perceived viewing distance. As discussed above, augmented reality (AR) superimposes a computer rendered image on to a user's view of the real world, thereby providing a composite or augmented view of the real world. The computationally expensive rendering of AR objects may be performed by a server and the rendered bitmaps of the AR objects may be sent to a client device (or other end node) for display. An AR application executing on the client device may be able to leverage Simultaneous Localization and Mapping ("SLAM") using sensing on the client device (e.g., ambient lighting sensor data, accelerometer sensor data, camera data, etc.) so that the rendered AR objects remain placed in the real world as the user or client device moves.

A view of the real world may be captured by a camera of the client device and displayed to the user as a real world scene. The user may, via the client device, place an AR object at a location within the real world scene. The placement of the AR object within the real world scene may correspond to a physical location within the real world. In order to virtualize the AR object within the real world scene, the client device may request a server for rendered images of the AR object. The server may render a sequence of masked images or streaming bitmaps of the AR object. The images may be rendered from the perspective of a virtual camera. The perspective of the virtual camera may generally correspond to the perspective of the client device camera. The sequence of rendered masked images or streaming bitmaps may be sent from the server to the client device. The client device may receive and position or overlay these streaming bitmaps on to the real world scene to create an illusion of the AR object within the real world.

An important aspect of AR is that digital information, such as rendered images of AR scenes and objects, are integrated with the user's view of the real world in real time. Transmitting large images of AR objects and scenes between the server and the client device consumes network bandwidth and may negatively impact the real time aspects of the AR experience. The size of the rendered images may be reduced by compressing the images, at the server, before they are sent to the client device. Rendered images of AR objects and scenes are generally compressed utilizing a single compression factor. The compression factor may be a ratio of the compressed and uncompressed size of the data. For example, an uncompressed image may include 10 MB of data. Compressing the image by applying a compression factor of 0.2 may result in 2 MB of data. Although image compression may reduce the amount of data transmitted over the network, it may also negatively impact the fidelity of the AR objects and thus, the reduce the overall quality of the user's AR experience.

AR objects may be positioned or placed at different depths within the user's view of the real world. However, the desired fidelity for an AR object that is placed closer to the user may be higher or greater than the desired fidelity for an AR object that is placed further away from the user. For example, an AR calendar object may be placed on a desk within the real world scene and an AR browser window object may be placed on a wall located further away from the desk within the real world scene. Similarly, a user may place a first 3D AR model on his/her hand and a second 3D AR model further away from the user within the real world scene. In both scenarios, the desired fidelity for the AR object that is placed closer to the user may be higher or greater than the desired fidelity for the AR object that is placed further away from the user. As another example, an AR object may span across a large distance in the z direction (depth axis). Since different regions of the AR object may correspond to different depths relative to the user, the desired fidelity may vary for different regions of the AR object corresponding to different depths. For example, the desired fidelity for regions of that are closer to the user may be greater or higher than the desired fidelity for regions that are farther away from the user.

Systems and methods according to this disclosure provide image compression of streaming AR content based on real world distances of AR objects relative to a user or client device. When a user places an AR object at a location in the real world scene via the client device, the client device may send a request to a server for the corresponding rendered images or bitmaps of the AR object. The request may include a real world distance of the AR object relative to the user or client device. The server may receive the request and render the images or bitmaps of the AR object. One or more compression factors may be determined based on the real world distance of the AR object. Different compression factors may be used for compressing different portions of the bitmap of the AR object. Thus, when an AR object is farther away from the user or client device, the compression factor may be higher than when the AR object is closer to the user or client device, thereby providing a desired fidelity for the AR object. The compressed bitmaps of the AR object may be sent from the server to the client device. The client device may overlay the bitmaps on to the user's view of the real world. In this manner, the compression factors selected for an AR object may vary in real time as the user or client device moves closer or further away from the AR object.

Systems and methods according to this disclosure provide image compression of streaming AR content based on relative depth information. The client device may send a request to a server for the corresponding rendered images or bitmaps of an AR scene comprising one or more AR objects. The request may include an absolute depth for the AR scene.

The absolute depth may be based on one or more real world distances for the AR objects relative the user or client device. An image or bitmap of the AR scene from the perspective of a virtual camera may be rendered. The perspective of the virtual camera may generally correspond to the perspective of the camera of the client device. A depth map may also be determined for the rendered image. The rendered image or bitmap may be partitioned or divided into a plurality of blocks. An average depth may be determined for each block. Determining the average depth for a block may be based on relative depth information. The relative depth information may be determined based on three dimensional information for the AR objects. A compression factor may be determined for each block based on the average depth for the block. The final bitmap of the AR scene may comprise the compressed bitmaps of the blocks. Based on relative depth information, a higher compression factor may be used for compressing portions of an AR object that are farther away from the user or client device.

Systems and methods according to this disclosure provide image compression of streaming AR content based on a type of information or content associated with an AR object. For example, a user may place an AR application window object on a wall far away from the user. The AR application window object may display visual information, such as text, diagrams, and/or alphanumeric characters. Even though the AR application window object may be placed far away from the user, the user may still be interested in clearly viewing the visual information. In such a case, even when the virtual object is placed far away from the AR client device, it may be desirable to render the AR object with high fidelity so that the visual information is clearly visible to the user from far away. A relatively lower compression factor may be selected for the portion of the AR object comprising the visual information or the entire AR object.

The image compression of streaming AR content provided by the systems and methods disclosed herein may also be applied to video codecs. Systems and methods disclosed herein provide image compression of AR content by dynamically adjusting the desired fidelity for AR content based on the real time user interaction with the AR content.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
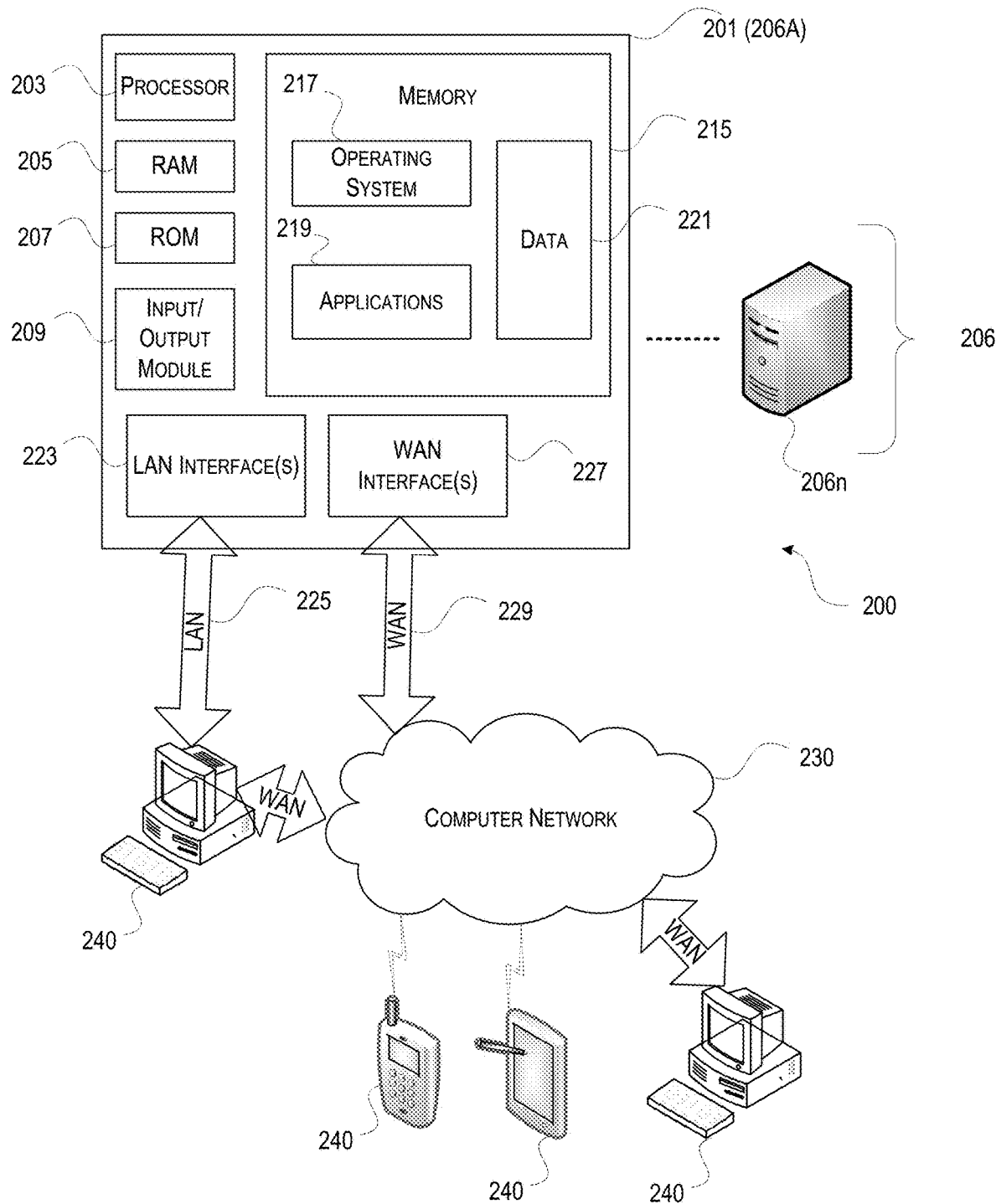
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206*a*-206*n* (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
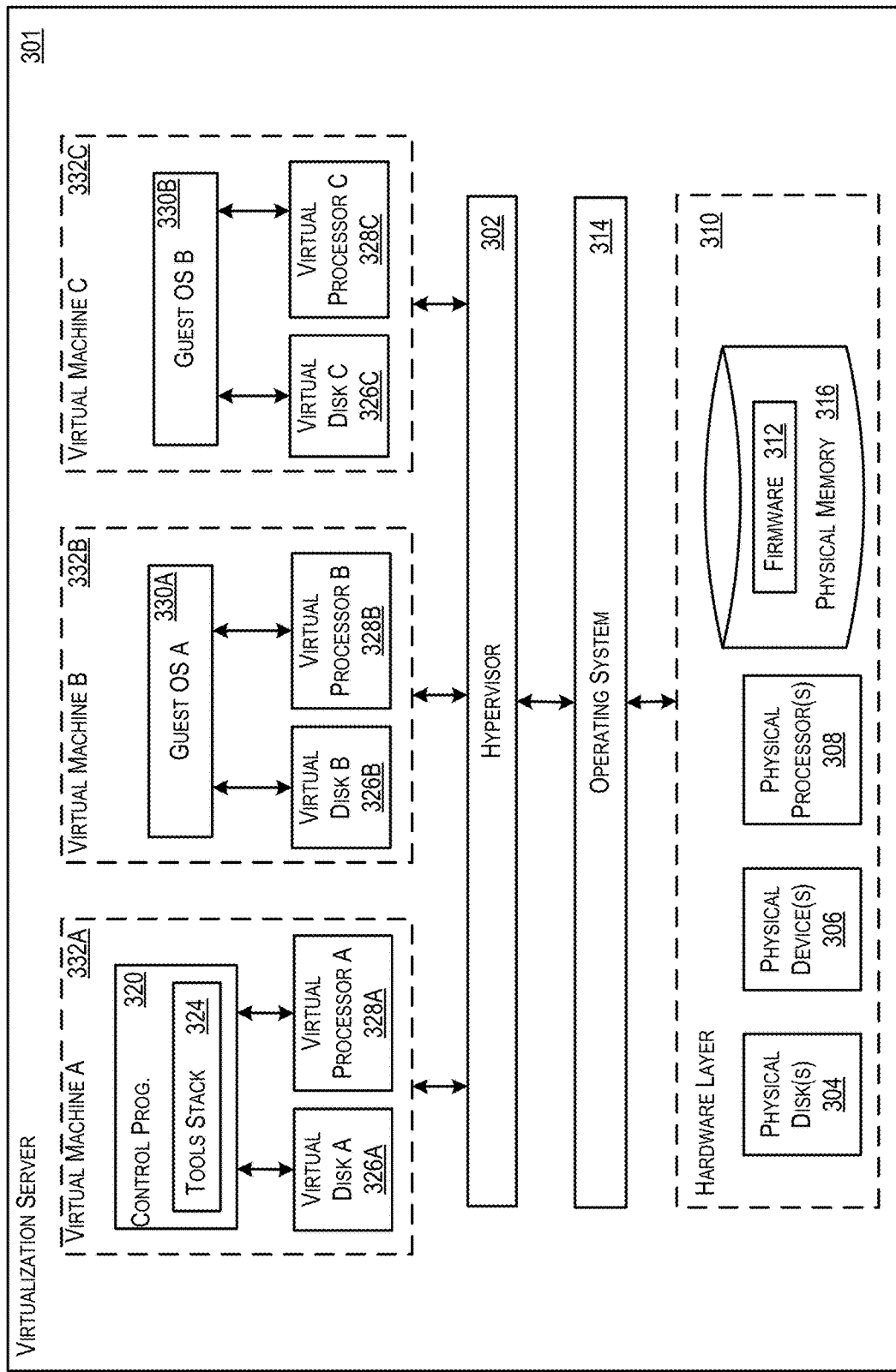
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
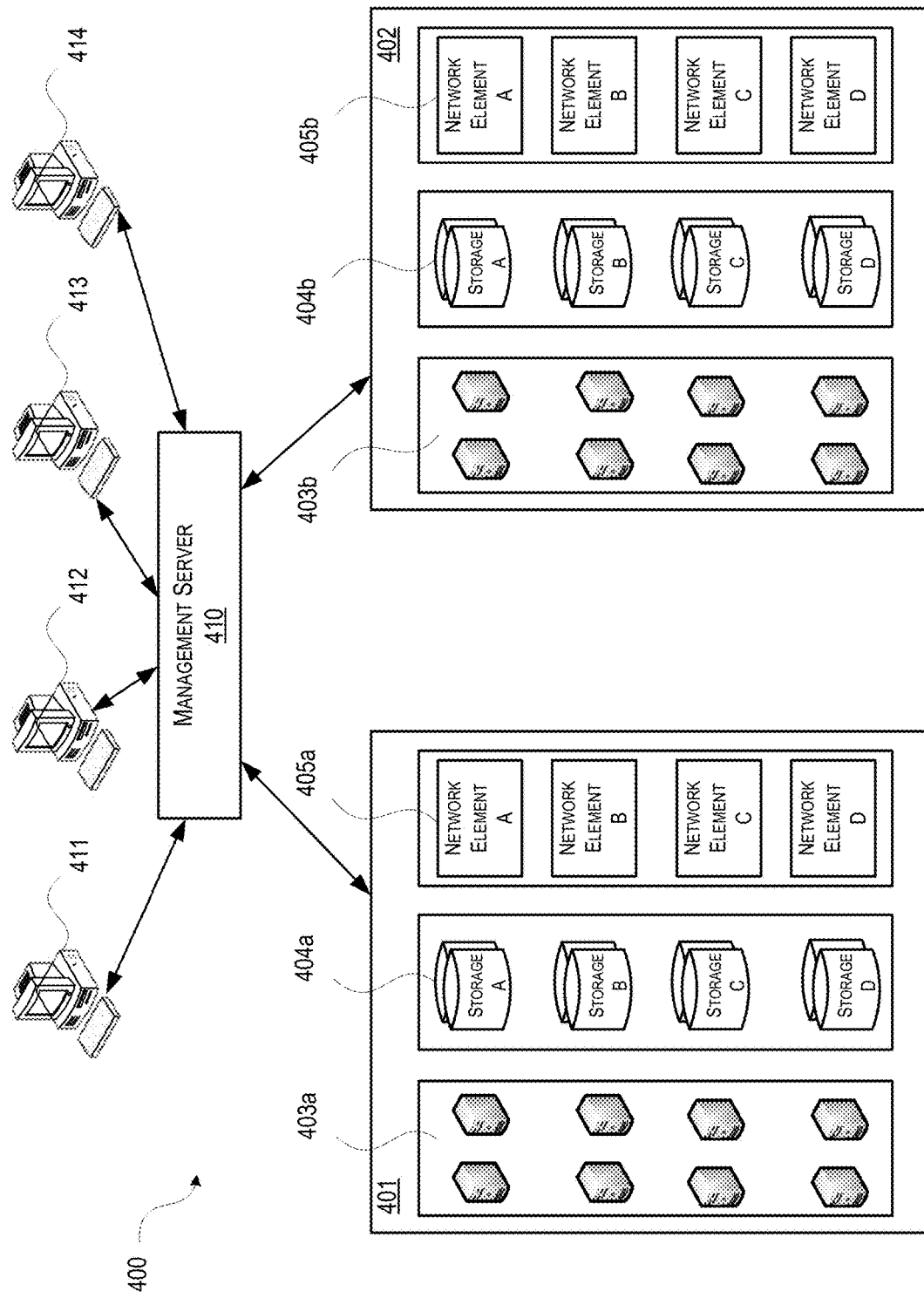
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Enterprise Mobility Management Architecture

Figure 5:
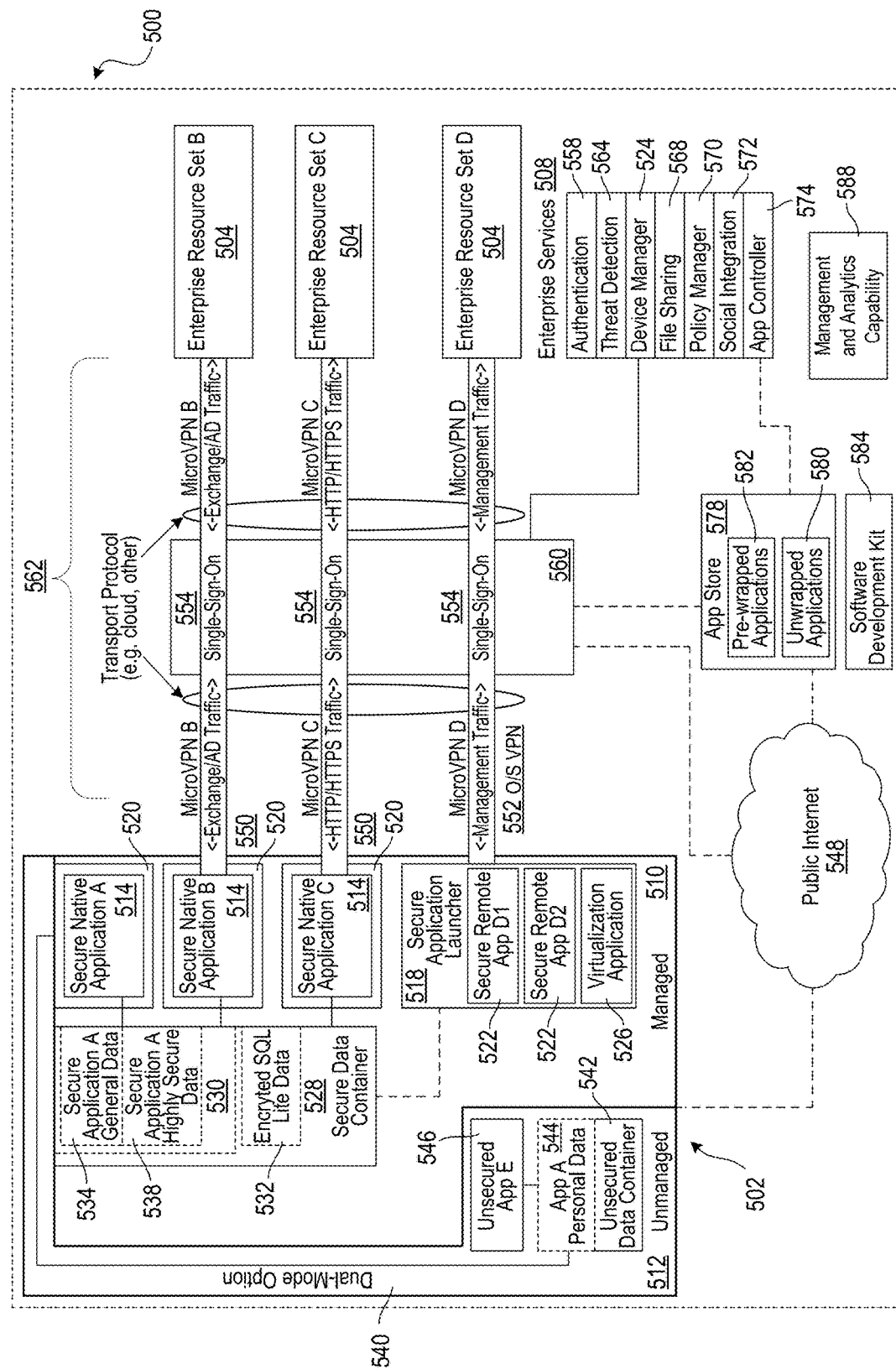
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
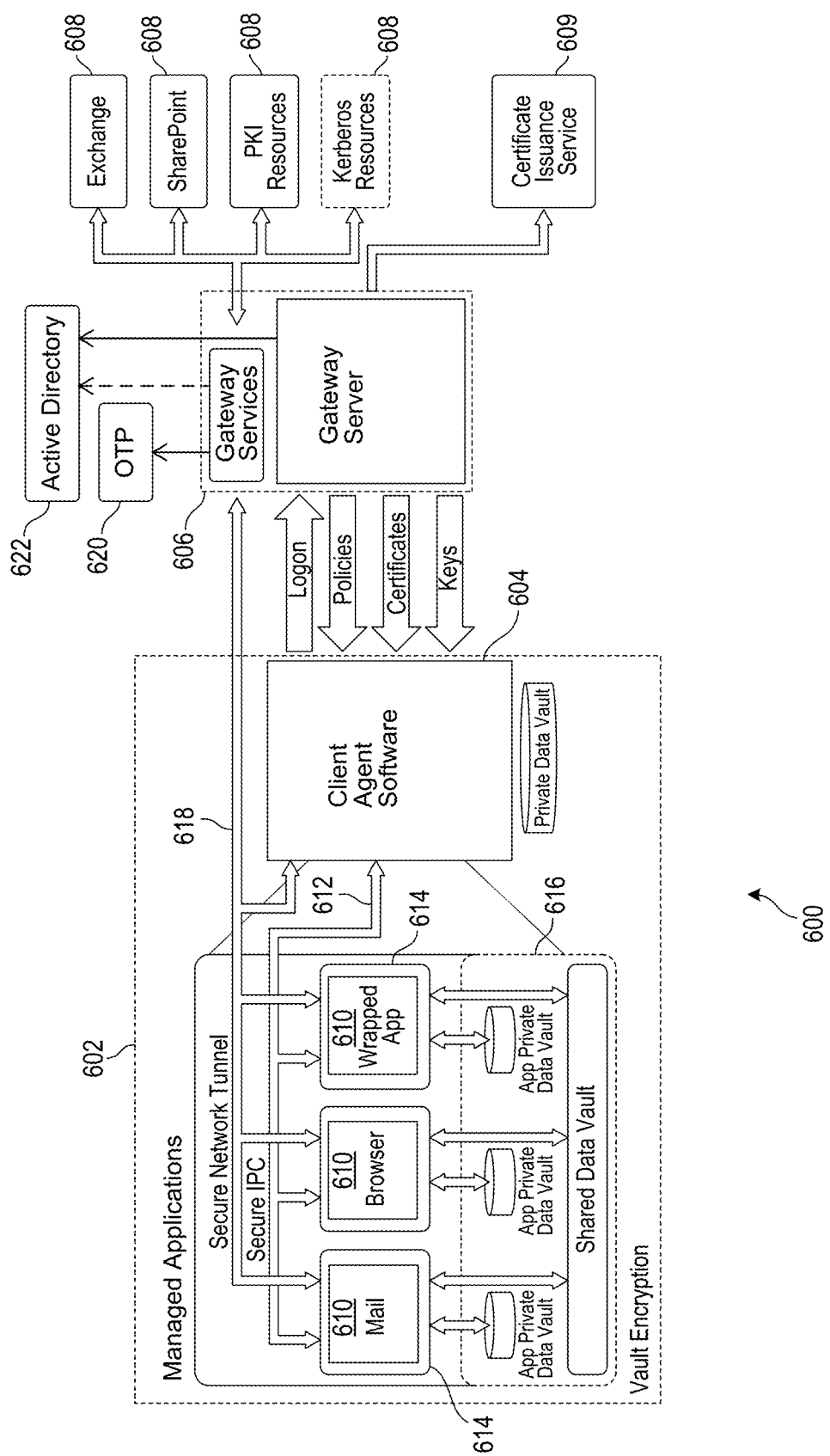
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Image Compression for Augmented Reality (AR) Content

Figure 7:
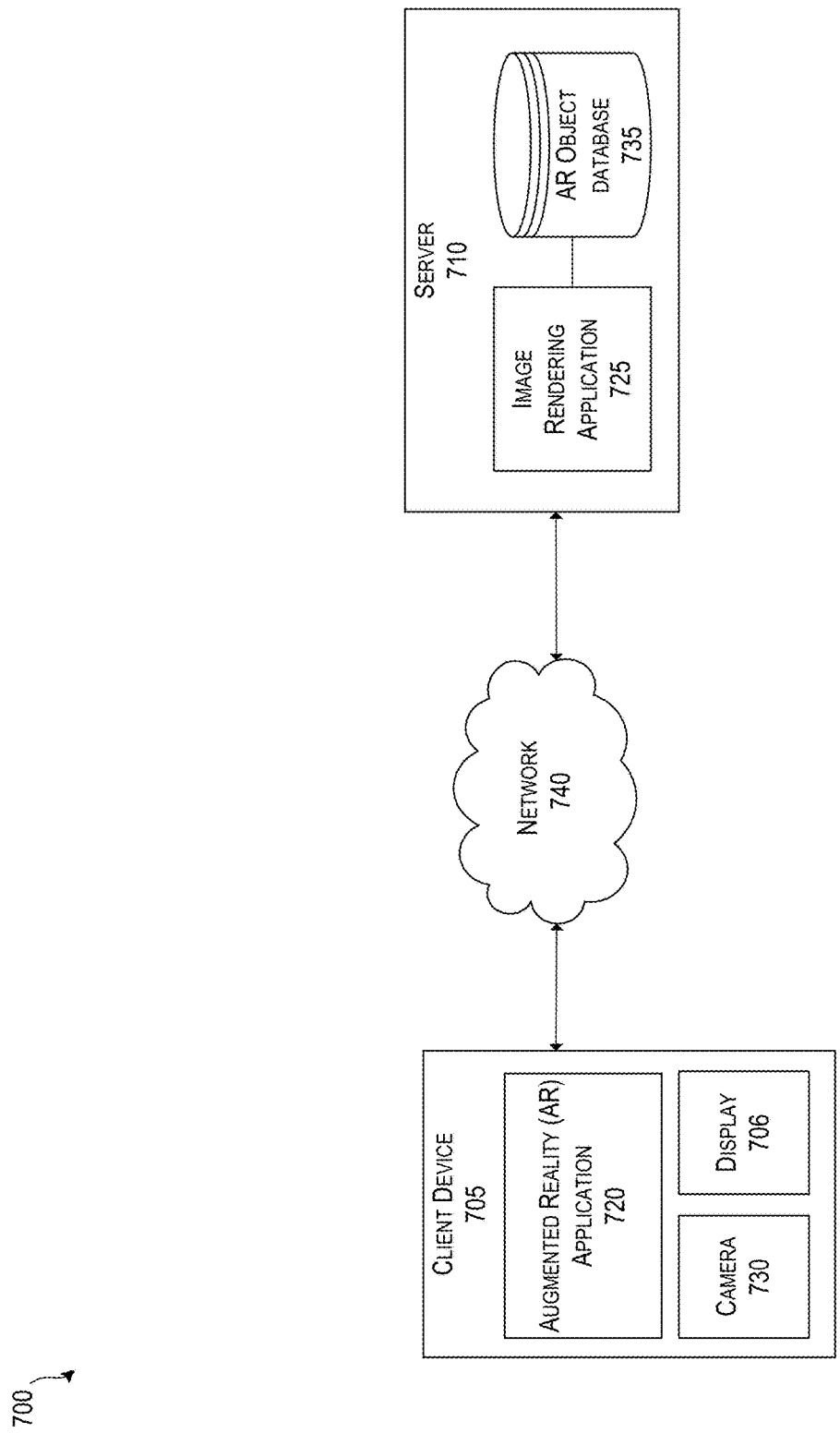
FIG. 7 depicts an example system for performing image compression of streaming AR content.
Figure 8:
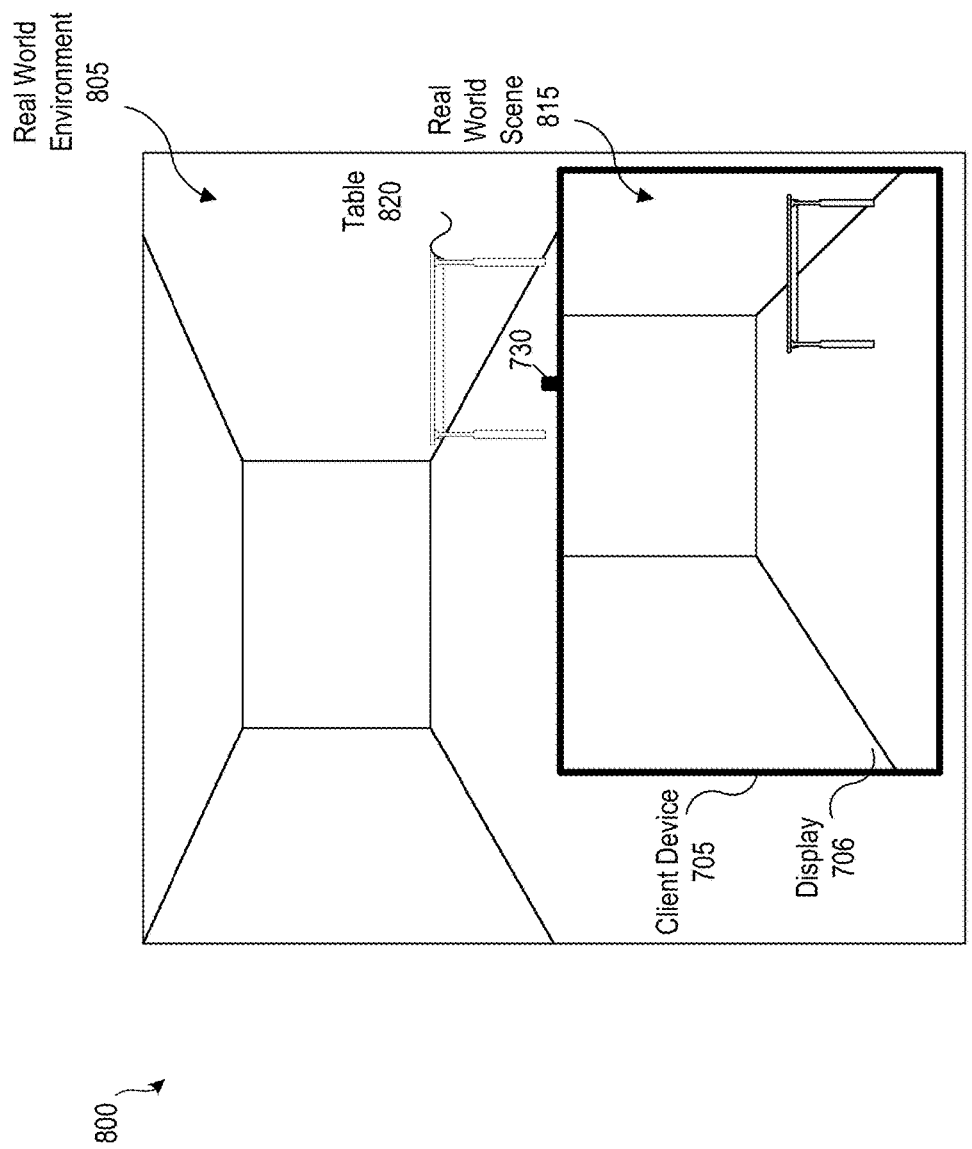
FIG. 8 depicts an example of a real world scene captured by a camera of a client device.

FIG. 7 shows an example system 700 for performing image compression of streaming AR content. The system 700 includes a client device 705 and a server 710 in communication via a network 740. The client device 705 and the server 710 may each be a computing device 210 shown in FIG. 2. Additionally, the client device 705 may be an AR client device, for example, a smartphone, tablet, head-mounted display (HMD), AR smart glasses, or smart lenses. The client device 705 may be configured to provide an AR or virtual environment by combining a real world view with virtual objects (AR objects). FIG. 8 depicts an example of a view of a real world environment 805 displayed by the client device 705. The real world environment 805 may comprise one or more objects, such as a table 820. A camera 730 of the client device 705 may receive input from the real world environment 805. The camera 730 may capture a view of the real world environment 805 based on the received input. The view of the real world environment 805 captured by the camera 730 may be displayed by the display 706 of the client device 705, as a real world scene 815. One or more virtual or AR objects or scenes may be overlaid on top of the real world scene 815 to create a composite virtual world. The client device 705 may be configured to facilitate real time interaction by the user with the virtual world. The client device 705 may also be configured to provide accurate 3D registration, within the real world environment 805, of virtual and real objects.

A memory of the client device 705 may comprise an augmented reality (AR) application 720. In response to user interaction, in real time, with a virtual world displayed by the client device 705, the AR application 720 may generate a request for rendered images or bitmaps of AR objects or scenes within the virtual world. For example, a user of the client device 705 may attempt to spawn an AR object on the table 820. In response, the AR application 720 may request a rendered model of the AR object. The request may be sent from the client device 705 to the server 710. Based on the request, the AR object may be rendered at the server 710.

The client device 705 may receive, from the server 710, the rendered AR object as a sequence of masked images or bitmaps of the AR object. The client device 705 may be configured to overlay the received images or bitmaps on to the real world scene 815 in real time.

As discussed above, AR objects and scenes may be rendered at the server 710. A memory of the server 710 may comprise an image rendering application 725. Based on the server 710 receiving a request for a rendered AR object, the image rendering application 725 may render one or more images or bitmaps of the AR object from the perspective of a virtual camera. The perspective of the virtual camera may generally correspond to the perspective of the camera 730 of the client device 705. Additionally, the image rendering application 725 may compress one or more portions of the rendered AR object. The memory of the server 710 may also include a database, such as an AR object database 730, comprising 3D models of AR objects. The image rendering application 725 may render and compress AR objects and scenes based on their 3D information stored in the AR object database 730. In some implementations, the AR object database 730 may be separate and independent of the server 710. The rendered AR object may comprise a sequence of masked images or streaming bitmaps that are sent from the server 710 to the client device 705. The client device 705 may overlay the masked images or bitmaps on to the user's view of the real world.

Figure 9:
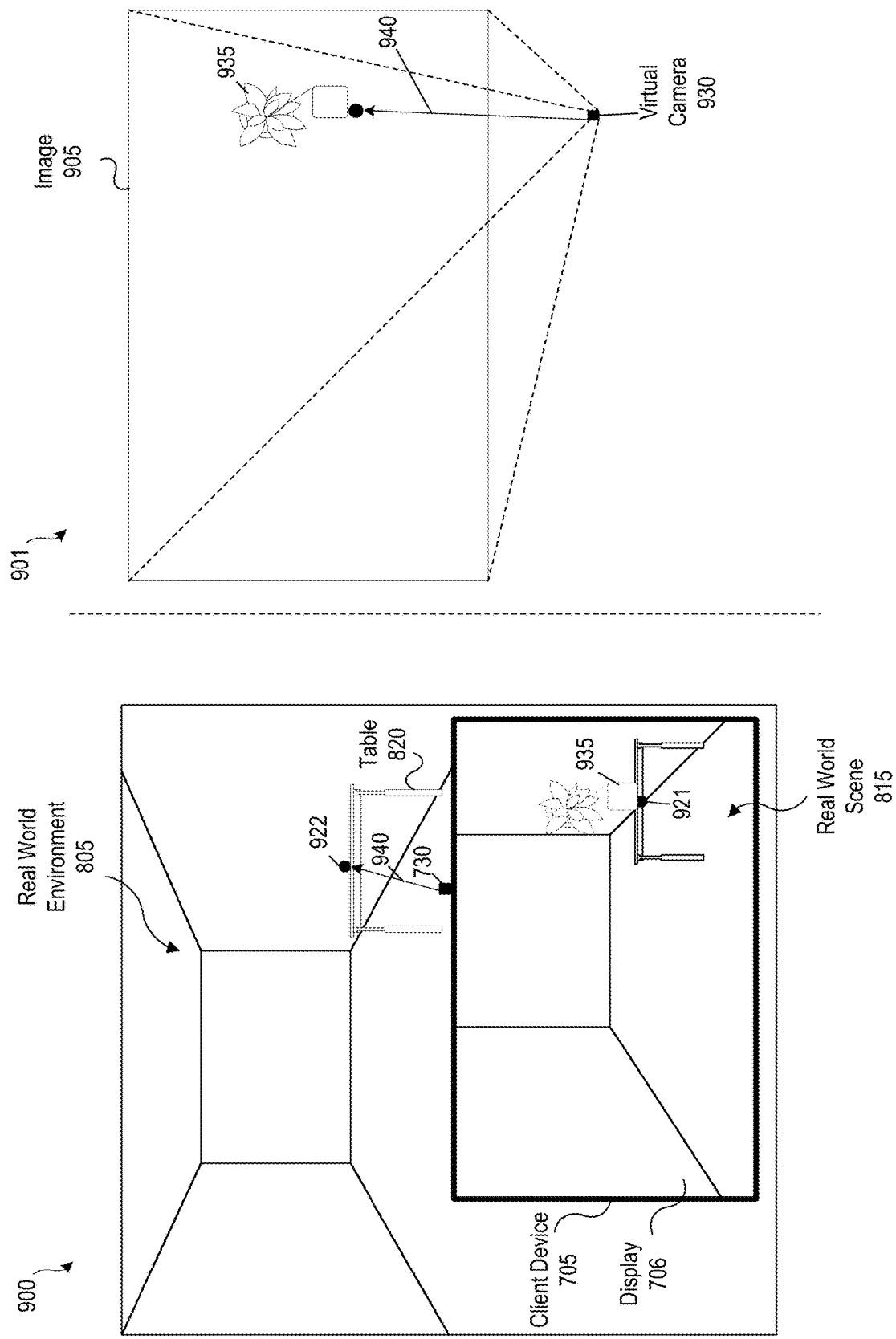
FIG. 9 depicts an example of an intended placement of a first AR object and an example rendering of the first AR object.

The image rendering application 725 may perform image compression of AR content based on real world distances associated with the AR content. In some implementations, the image rendering application 725 may perform image compression of AR content based on real world distance information associated with the AR content. For example, a user may, via the client device 705, attempt to place an AR object within a real world view. FIG. 9 shows an example of an intended placement, via the client device 705, of a first AR object 935 and an example rendering of the first AR object 935 at the server 710. The intended placement location of the first AR object 935 within the real world scene 915 may be registered in a three dimensional manner within the real world environment 805 and may therefore, correspond to a real world location 922. The AR application 720 may generate a request for the rendered first AR object 935. The request may comprise a measurement of a real world distance 940 between the client device 705 and the real world location 922. The request may be sent from the client device 705 to the server 710 over the network 140. Based on the server 710 receiving the request, the image rendering application 725 may render the first AR object 935. The image rendering application 725 may render the first AR object 935 from the perspective of a virtual camera 930. The perspective of the virtual camera 930 may generally correspond to the perspective of the camera 730 of the client device 705. The image rendering application 725 may render one or more images of the first AR object 935, such as the image 905 shown in FIG. 9. The image 905 may comprise a bitmap or spatially mapped array of pixels.

The image rendering application 725 may compress the image 905. As discussed above, the desired fidelity (i.e. user interactability with the AR object, resolution, etc.) for an AR object that is placed closer to the user of the client device 705 may be higher or greater than for an AR object that is placed farther away from the user. Thus, a level of compression applied to the first AR object 935 may be based on its real world distance 940 relative to the client device 705. The image rendering application 725 may determine a compression factor or compression ratio for the first AR object 935 based on the real world distance 940. The compression factor may be a ratio of the compressed size and the uncompressed size of the data. For example, an uncompressed portion of the image 905 may include 10 MB of data. Compressing this portion of the image 905 by applying a compression factor of 0.2 may result in 2 MB of data.

A compression factor based on the real world distance 940 may be determined or selected in various ways. In some implementations, a compression factor for the first AR object 935 may be selected based on one or more threshold distances. Table 1 below shows an example of real world distances and their corresponding compression factors. As an example, if the real world distance 940 of the first AR object 935 is less than 5 meters, then the value of the compression factor may be selected as 0.9. If the real world distance 940 is greater than or equal to 5 meters and less than 10 meters, then the value of the compression factor may be selected as 0.7. If the real world distance 940 is greater than or equal to 10 meters and less than 15 meters, then the value of the compression factor may be selected as 0.5. If the real world distance 940 is greater than or equal to 15 meters and less than 20 meters, then the value of the compression factor may be selected as 0.4. If the real world distance 940 is greater than or equal to 20 meters, then the value of the compression factor may be selected as 0.2. Thus, a higher level of compression may be applied to the image 905 of the first AR object 935 as the real world distance 940 increases and a lower level of compression may be applied as the real world distance 940 decreases. The compression factor selected for the first AR object 935 may vary dynamically in real time as the user moves closer or farther away from the first AR object 935. Additionally, the thresholds set for the real world distances 940 and corresponding compression factors may be determined based on various factors, such as network capabilities, the type of AR application or client device 705 that is being used, contextual information, user settings, etc. In some implementations, the threshold distances and corresponding compression factors may be stored in a look-up table.

TABLE 1

Real world distances and compression factors.

| Real world distance (meters) | Compression Factor |
| --- | --- |
| >=20 meters | 0.2 |
| >=15 meters and <20 meters | 0.4 |
| >=10 meters and <15 meters | 0.5 |
| >=5 meters and <10 meters | 0.7 |
| <5 meters | 0.9 |

In some implementations, the compression factors may be determined based on the equation below, where x is the real world distance.

$$\text{compression factor} = \frac{10}{e^x}$$

Figure 10:
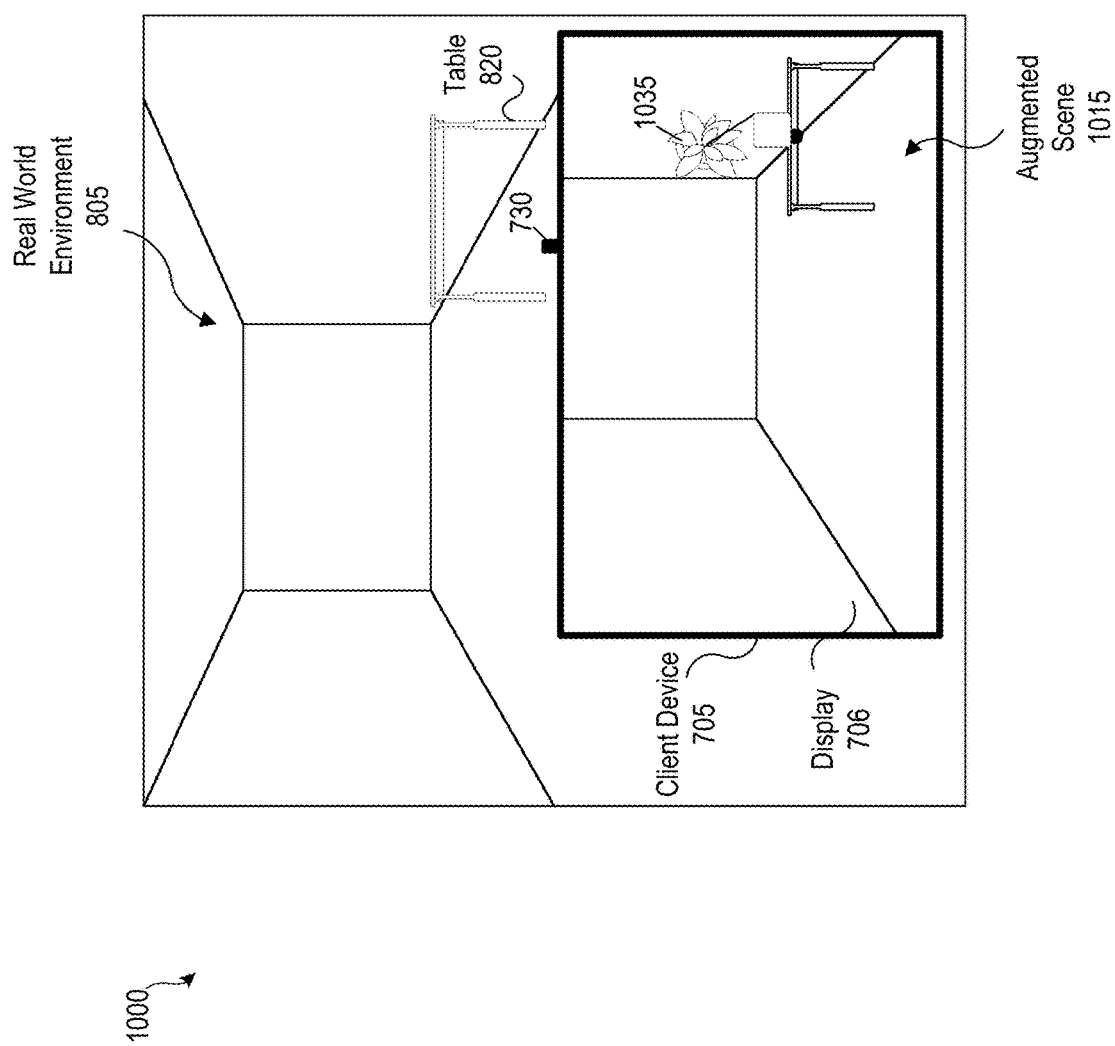
FIG. 10 depicts an example of the first AR object overlaid on to a real world scene.

The image rendering application 725 may compress the pixels of the image 905 based on the determined compression factor. Alternatively, the pixels of the image 905 corresponding to the first AR object 935 may be based on the determined compression factor while the pixels of the image 905 not corresponding to the first AR object 935 may be compressed based on a different compression factor, for example, a default compression factor. The compressed first AR object 935 may comprise a sequence of masked images or streaming bitmaps may be sent from the server 710 to the client device 705. The client device 705 may receive the sequence of masked images or streaming bitmaps from the server 710 and overlay them on to the real world scene 915. FIG. 10 shows an example of an augmented scene 1015 based on overlaying the rendered first AR object 1035 received from the server 710 on to the real world scene 915 shown in FIG. 9.

Figure 11:
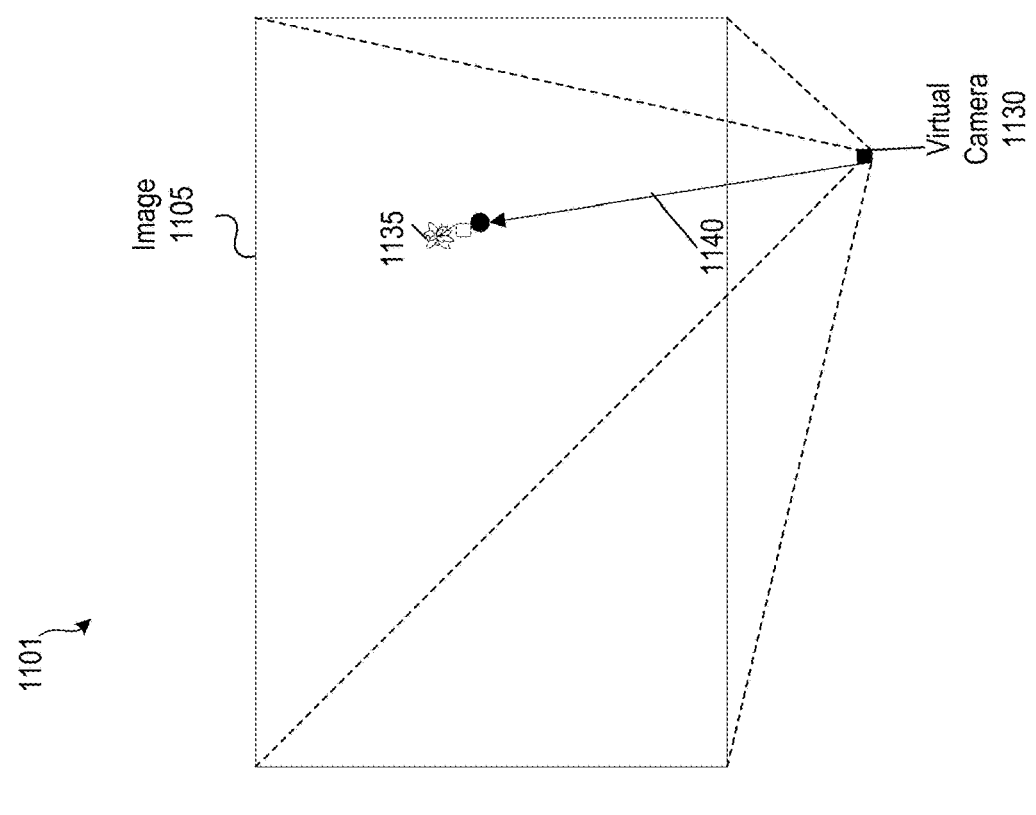
FIG. 11 depicts an example of an intended placement of a second AR object and an example rendering of the second AR object.
Figure 11:
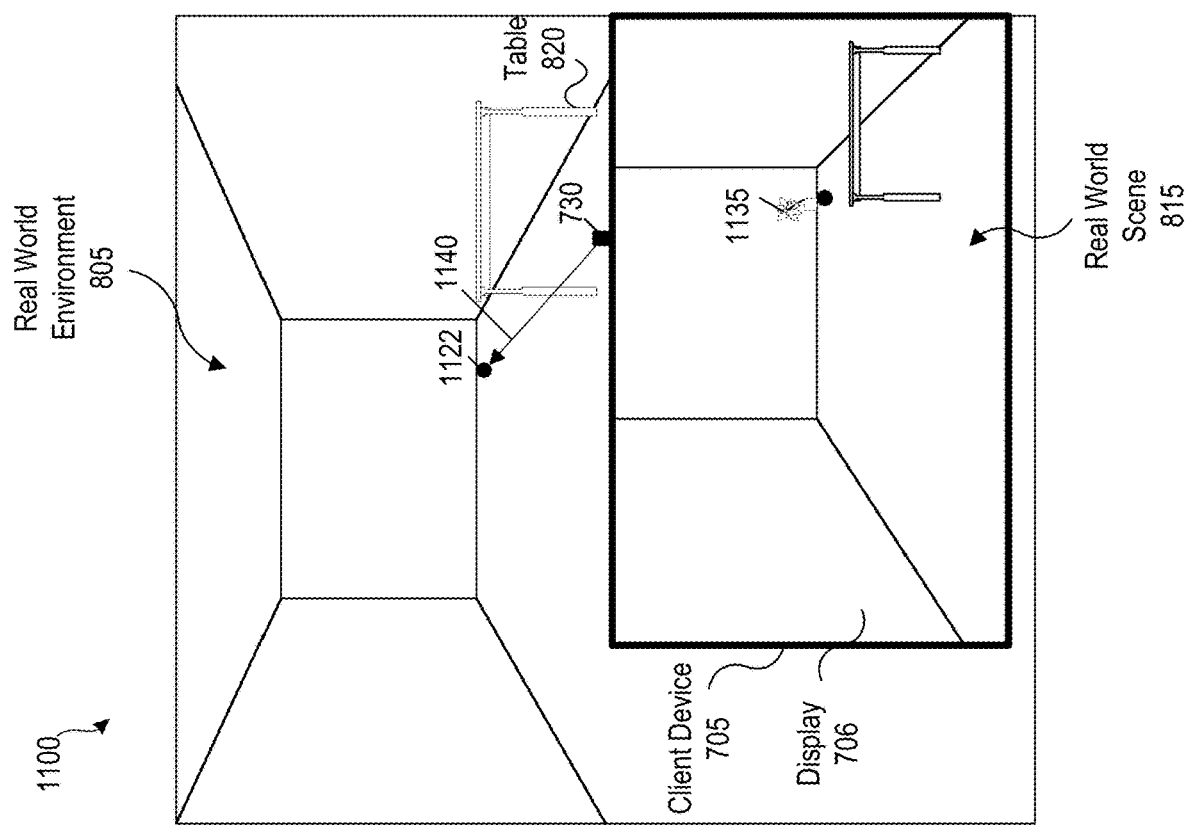

As discussed above, the level of compression selected for an AR may vary dynamically in real time as the user moves closer or farther away from the AR object. FIG. 11 shows an example of an intended placement, via the client device 705, of a second AR object 1135 and an example of a rendering of the second AR object 1135 at the server 710. The intended placement of the second AR object 1135 within the real world scene 1115 may correspond to a real world location 1122 within the real world environment 805. The AR application 720 may generate a request for a rendering of the second AR object 1135. The request may comprise a measurement of a real world distance 1140 between the client device 705 and the real world location 1122. The request may be sent from the client device 705 to the server 710 over the network 140. Based on the server 710 receiving the request, the image rendering application 725 may render the second AR object 1135. The image rendering application 725 may render the second AR object 1135 from the perspective of a virtual camera 1130. The perspective of the virtual camera 1130 may generally correspond to the perspective of the camera 730 of the client device 705. The image rendering application 725 may render one or more images of the second AR object 1135, such as the image 1105 shown in FIG. 11. The image 1105 may comprise a bitmap or spatially mapped array of pixels.

Figure 12:
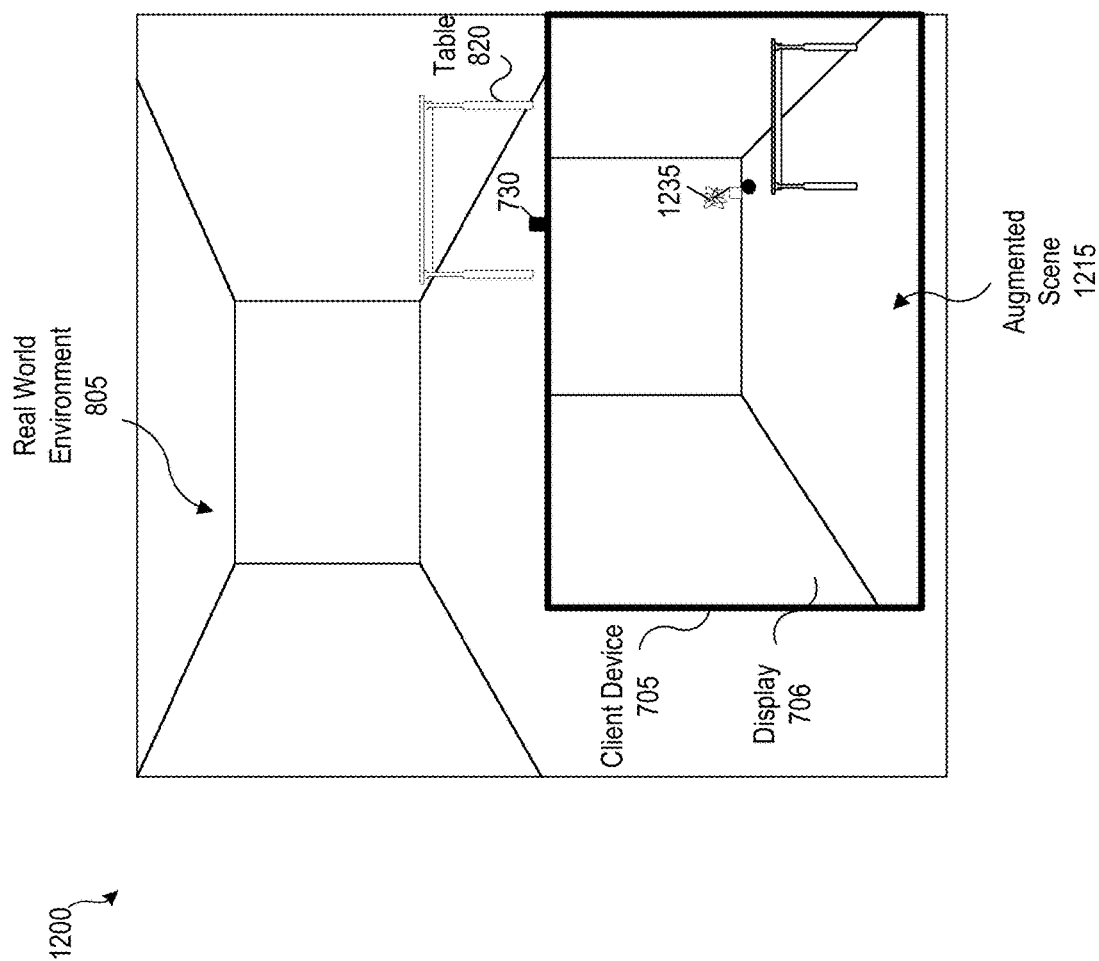
FIG. 12 depicts an example of the second AR object overlaid on to a real world scene.

The image rendering application 725 may compress the image 1105. Referring back to FIG. 9, the placement of the first AR object 935 is much closer to the client device 705 than the placement of the second AR object 1135 shown in FIG. 11. As an example, the real world distance 1140 corresponding to the intended placement of the second AR object 1135 may be 21 meters. Based on the criteria shown in Table 1 above, the value of the compression factor may be selected as 0.2. The image rendering application 725 may compress the pixels of the image 1105 based on the determined compression factor of 0.2. Alternatively, the pixels of the image 1105 corresponding to the second AR object 1135 may be based on the determined compression factor while the pixels of the image 1105 not corresponding to the second AR object 1135 may be compressed based on a different compression factor, for example, a default compression factor. The compressed second AR object 1135 may comprise a sequence of masked images or streaming bitmaps may be sent from the server 710 to the client device 705. The client device 705 may receive the sequence of masked images or streaming bitmaps from the server 710 and overlay them on to the real world scene 1115. FIG. 12 shows an example of an augmented scene 1215 based on overlaying the rendered second AR object 1235 on to the real world scene 1115 shown in FIG. 11.

Figure 13:
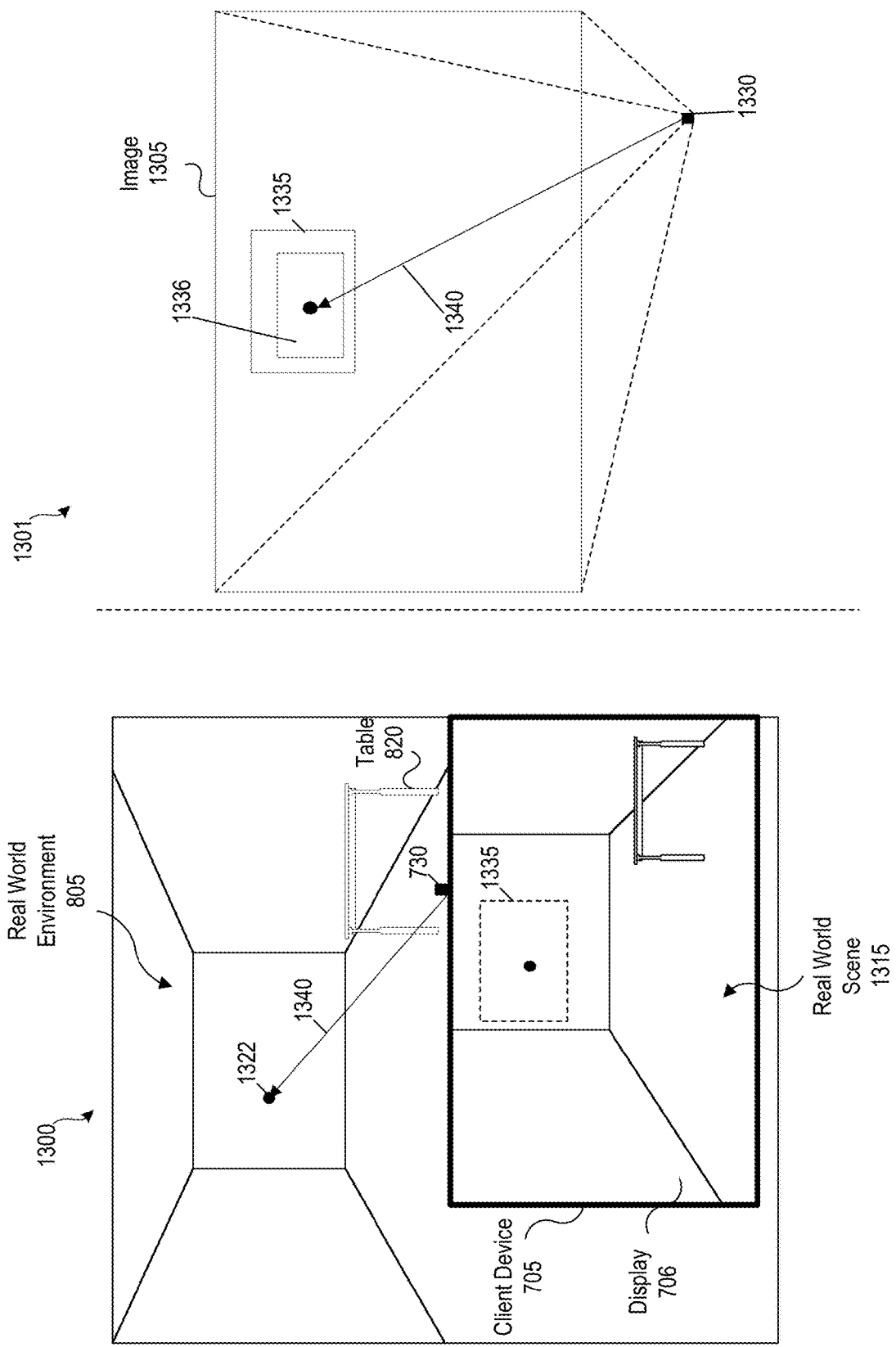
FIG. 13 depicts an example of an intended placement of an AR browser window object and an example rendering of the AR browser window object.

The image rendering application 725 may perform image compression of AR content based on a type of visual information or content represented or associated with the AR content. FIG. 13 shows an example of an intended placement, via the client device 705, of an AR browser window object 1335 and an example rendering of the AR browser window object 1335 at the server 710. At least a portion of the AR browser window object 1335 may comprise textual or other visual information that the user is likely to be interested in reading regardless of how far away the user is from the AR browser window object 1335. The intended placement of the AR browser window object 1335 within the real world scene 1315 may correspond to a real world location 1322 within the real world environment 805. The AR application 720 may generate a request for a rendering of the AR browser window object 1335. The request may comprise a measurement of a real world distance 1340 between the client device 705 and the real world location 1322. The request may be sent from the client device 705 to the server 710 over the network 140. Based on the server 710 receiving the request, the image rendering application 725 may render the AR browser window object 1335. The image rendering application 725 may render the AR browser window object 1335 from the perspective of a virtual camera 1330. The perspective of the virtual camera 1330 may generally correspond to the perspective of the camera 730 of the client device 705. The image rendering application 725 may render one or more images of the AR browser window object 1335, such as the image 1305 shown in FIG. 13. The image 1305 may comprise a bitmap or spatially mapped array of pixels. The image rendering application 725 may compress the image 1305. Referring back to FIG. 12, the placement of the AR browser window object 1335 is at least as far away from the client device 705 as the placement of the second AR object 1135 shown in FIG. 12. As an example, the real world distance 1340 corresponding to the intended placement of the AR browser window object 1335 may be 21 meters. Based on the criteria shown in Table 1 above, the value of the compression factor may be selected as 0.2.

Figure 14:
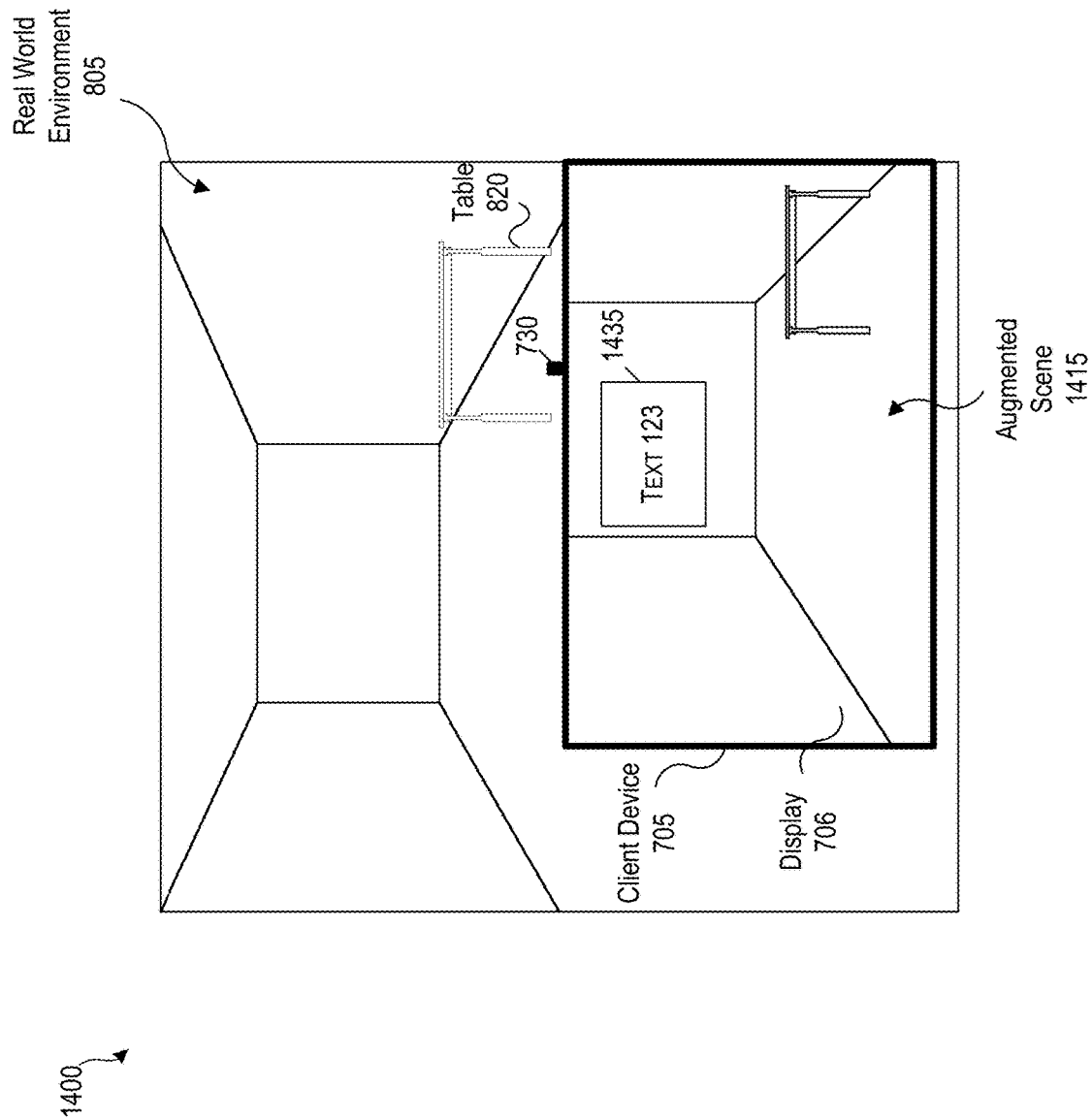
FIG. 14 depicts an example of the AR browser window object overlaid on to a real world scene.

However, the desired fidelity for the AR browser window object 1335 may be higher than the fidelity resulting from a compression based on the compression factor of 0.2. As discussed above, at least a portion of the AR browser window object 1335, such as the portion 1336, may comprise textual or other visual information that the user is likely to be interested in reading regardless of how far away the user is from the AR browser window object 1335. Thus, the compression factor selected for at least the portion 1336 may be higher than 0.2. The compression factor selected based on visual information associated with an AR object may be determined in various ways. For example, the image compression application 725 may recognize or identify specific portions of an AR object that be associated with visual information. Alternatively, the corresponding 3D model of the AR object in the 3D AR object database 730 may comprise information indicating one or more portions of the AR object that may be associated with visual information. In some implementations, the visual implementation may comprise text, alphanumeric characters, graphs, or any other visual details that may need to be presented to the user at a high fidelity regardless of how far the user is from the AR object. In view of the foregoing, a higher value, such as 0.9, may be selected for the portion 1336 of the AR browser window object 1335. The image rendering application 725 may compress the pixels of the image 1305 corresponding to the portion 1336 of the AR browser window object 1335 based on the compression factor of 0.9, and compress the pixels of the image 1105 corresponding to the AR browser window object 1335 not including the portion 1336 based on the compression factor of 0.2. Additionally, the portion of the image 1105 not corresponding to the AR browser window object 1335 (including the portion 1336) may be compressed according to a different compression factor, such as default compression factor. The compressed AR browser window object 1335 may comprise a sequence of masked images or streaming bitmaps may be sent from the server 710 to the client device 705. The client device 705 may receive the sequence of masked images or streaming bitmaps from the server 710 and overlay them on to the real world scene 1315. FIG. 14 shows an example of an augmented scene 1415 based on overlaying a rendering of the AR browser window object 1435 on to the real world scene 1315 shown in FIG. 13.

Figure 15:
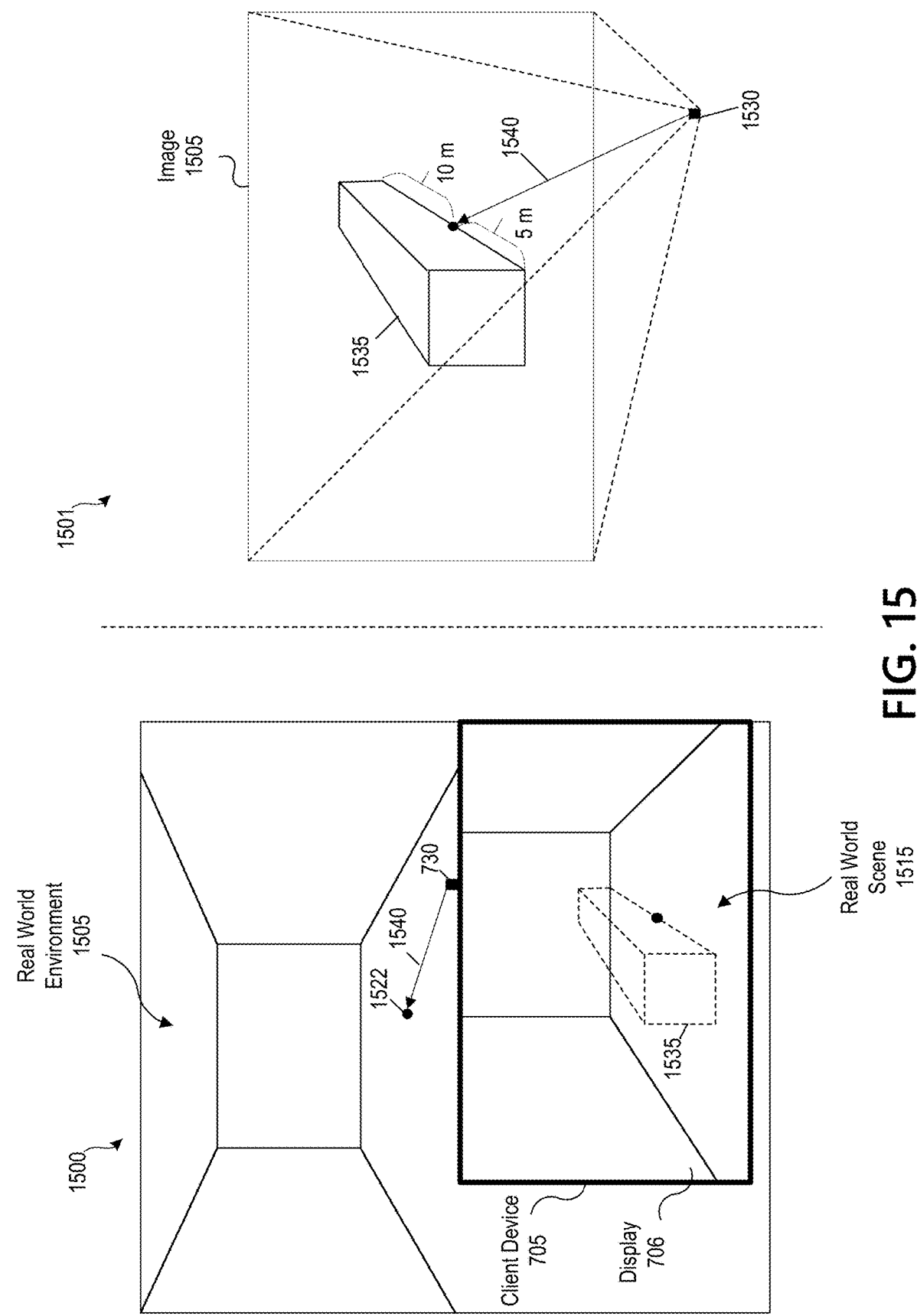
FIG. 15 depicts an example of an intended placement of another AR object and an example rendering of the AR object.

The image rendering application 725 may perform image compression of AR content based on relative depth information associated with the AR content. For example, an AR object may span across a large region in the z direction (depth axis). Since different regions of the AR object may correspond to different depths relative to the user, the desired fidelity may vary across the different regions of the AR object. For example, the desired fidelity for the regions of the AR object that are closer to the user may be greater or higher than the desired fidelity for the regions that are farther away from the user. FIG. 15 shows an example of an intended placement, via the client device 705, of an AR object 1535 and an example rendering of the AR object 1535 at the server 710. The intended placement of the AR object 1535 within the real world scene 1515 may correspond to a real world location 1522 within the real world environment 805. The AR application 720 may generate a request for a rendering of the AR object 1535. The request may comprise a measurement of a real world distance 1540 between the client device 705 and the real world location 1522. The request may be sent from the client device 705 to the server 710 over the network 140. Based on the server 710 receiving the request, the image rendering application 725 may render the AR object 1535. The image rendering application 725 may render the AR object 1535 from the perspective of a virtual camera 1530. The perspective of the virtual camera 1330 may generally correspond to the perspective of the camera 730 of the client device 705. The image rendering application 725 may render one or more images of the AR object 1535, such as the image 1505 shown in FIG. 15. The image 1505 may comprise a bitmap or spatially mapped array of pixels.

The image rendering application 725 may determine depth information for the AR object 1535 relative to an absolute depth. For example, the absolute depth may be the real world distance 1540. The depth of the AR object 1535 relative to the real world distance 1540 may be determined based on the 3D model of the AR object 1535 in the 3D object database 730. As shown in FIG. 15, the depth of the AR object 1535 from the real world location 1522 and towards the client device 705 is 5 meters. Additionally, the depth of the AR object 1535 from the real world location 1522 and away from the client device 705 is 10 meters.

Figure 16:
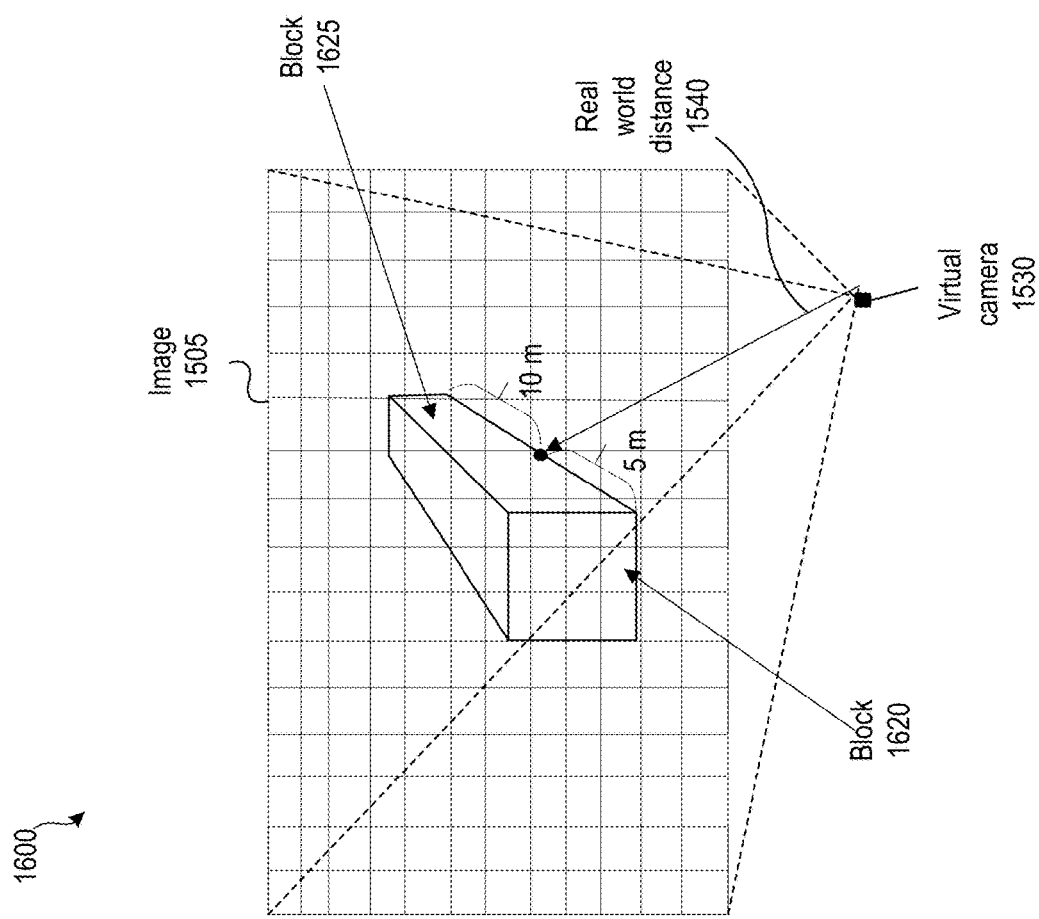
FIG. 16 depicts an example of partitioning a rendered image of the AR object into a plurality of blocks.

Based on the relative depth information associated with the AR object 1535, the image rendering application 725 may determine a depth map for the image 1505 from the perspective of the virtual camera 1530. The image rendering application 725 may partition or divide the bitmap for the image 1505 and its corresponding depth map into a plurality of blocks. FIG. 16 shows an example of the image 1505 partitioned into a plurality of blocks. The image rendering application 725 may determine an average depth for each block. The average depth may be determined based on the relative depth information associated with the AR object 1535. Each block of the depth map may comprise the average depth determined for its corresponding block in the image 1505. As shown in FIG. 16, block 1620 is much closer to the virtual camera 1530 than block 1625. Thus, the average depth determined for the portion of the AR object 1535 within the block 1620 may smaller than the average depth determined for the portion of the AR object 1535 within the block 1625.

Figure 17:
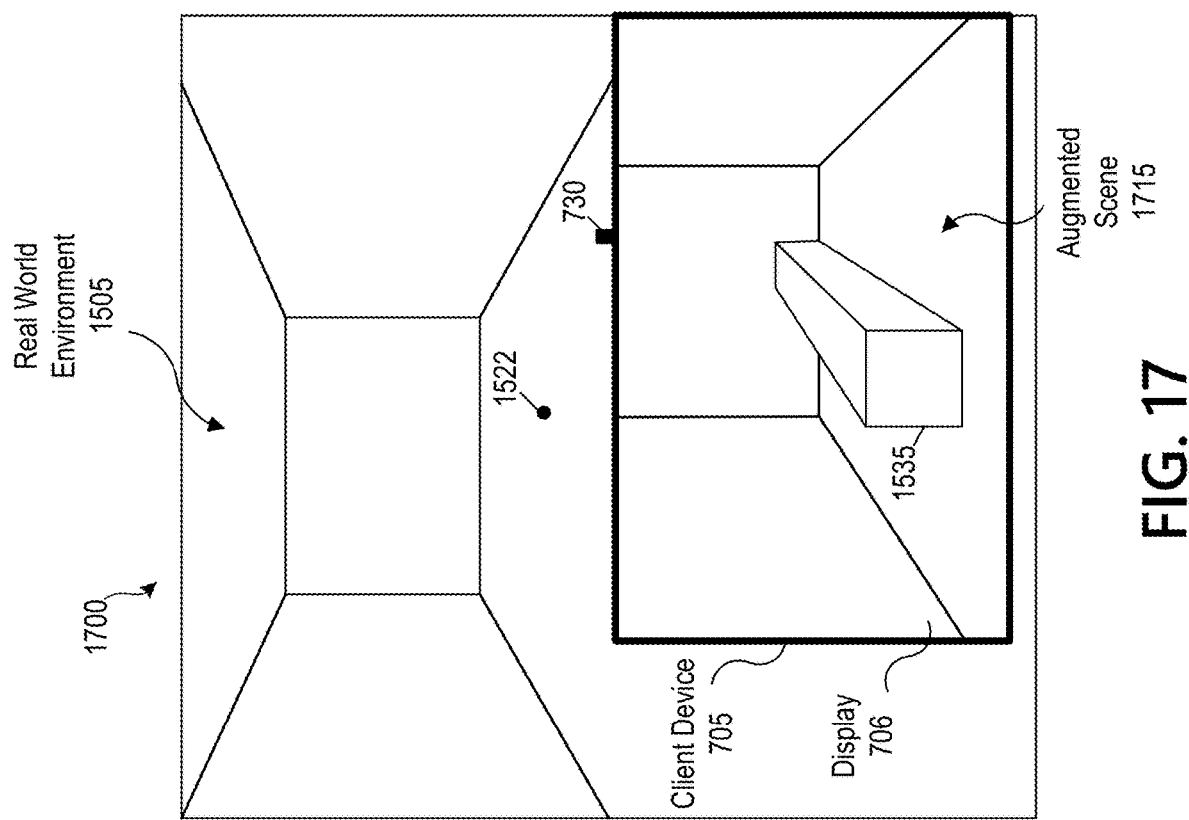
FIG. 17 depicts an example of an augmented scene including the AR object.

The image rendering application 725 may determine a compression factor for each block of the image 1505 based on its average depth. For example, the value of the compression factor for the block 1620 may be selected as 0.9 while the value of the compression factor for the block 1625 may be selected as 0.2. The image rendering application 725 may compress the pixels of the AR object 1535 corresponding to each block of the image 1505 based on the compression factor determined for that block. For example, pixels of the AR object 1535 corresponding to or within the block 1620 based on the compression factor of 0.9 and compress the pixels of the AR object 1535 corresponding to or within the block 1625 based on the compression factor of 0.2. Additionally, the image rendering application 725 may compress the pixels of the image 1505 not corresponding to the AR object 1535 based on a different compression factor, for example, a default compression factor. The default compression factor may be different from the compression factors that are selected for the AR object 1535. The final bitmap may comprise the compressed bitmaps for the blocks of the image 1505. The compressed image 1505 may comprise a sequence of masked images or streaming bitmaps and may be sent from the server 710 to the client device 705. The client device 705 may receive the sequence of masked images or streaming bitmaps from the server 710 and overlay them on to the real world scene 1515. FIG. 17 shows an example of an augmented scene 1715 based on overlaying a rendered AR object 1735 on to the real world scene 1515 shown in FIG. 15.

Figure 18:
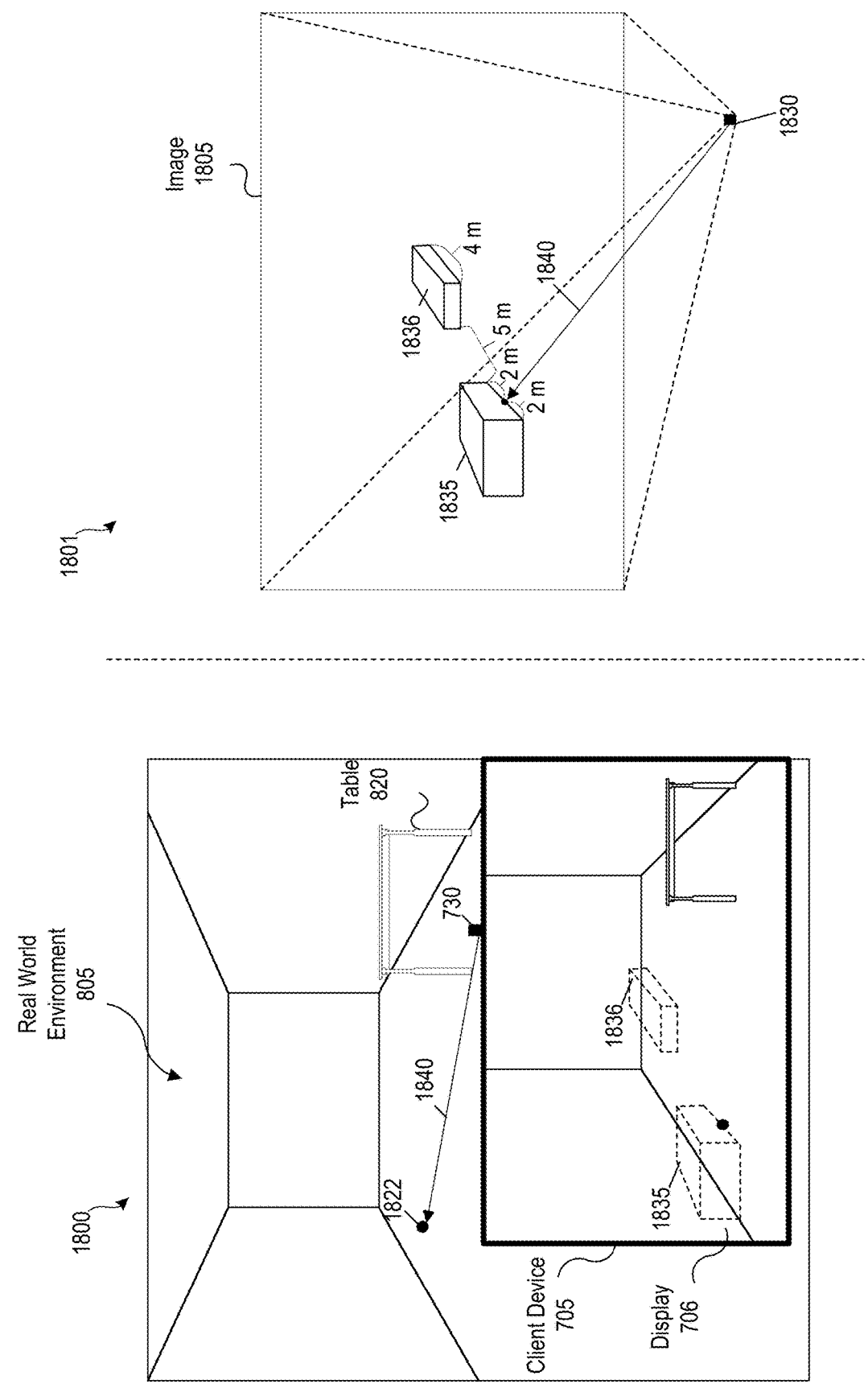
FIG. 18 depicts an example of an intended placement of an AR scene and an example rendering of the AR scene.

In some implementations, image rendering application 725 may perform image compression of an AR scene comprising a plurality of AR objects. FIG. 18 shows an example of an intended placement, via the client device 705, of an AR scene comprising a first AR object 1835 and a second AR object 1836 and an example rendering of the AR scene at the server 710. The intended placement of the AR scene within the real world scene 1515 may correspond to a real world location 1822 within the real world environment 805. The AR application 720 may generate a request for a rendering of the AR scene. The request may comprise a measurement of a real world distance 1840 between the client device 705 and the real world location 1822. The request may be sent from the client device 705 to the server 710 over the network 140. Based on the server 710 receiving the request, the image rendering application 725 may render the AR scene. The image rendering application 725 may render the AR scene from the perspective of a virtual camera 1830. The perspective of the virtual camera 1830 may generally correspond to the perspective of the camera 730 of the client device 705. The image rendering application 725 may render one or more images of the AR scene, such as the image 1805 shown in FIG. 15. The image 1505 may comprise a bitmap or spatially mapped array of pixels.

The image rendering application 725 may determine depth information for the first and second AR objects 1835 and 1836 relative to an absolute depth associated with the AR scene. As an example, the absolute depth for the AR scene may be the real world distance 1840. The depth information for the first and second AR object 1835 and 1836 relative to the real world distance 1840 may be determined based on their respective 3D models in the 3D object database 730. As shown in FIG. 18, the depth of the first AR object 1535 from the real world location 1822 and towards the client device 705 is 2 meters. The depth of the first AR object 1835 from the real world location 1522 and away from the client device 705 is also 2 meters. The relative depth information for the second AR object 1836 may be based on its distance in the z direction from the first AR object 1835, shown in FIG. 18 as 5 meters. Additionally, the depth of the second AR object 1836 is 4 meters.

Figure 19:
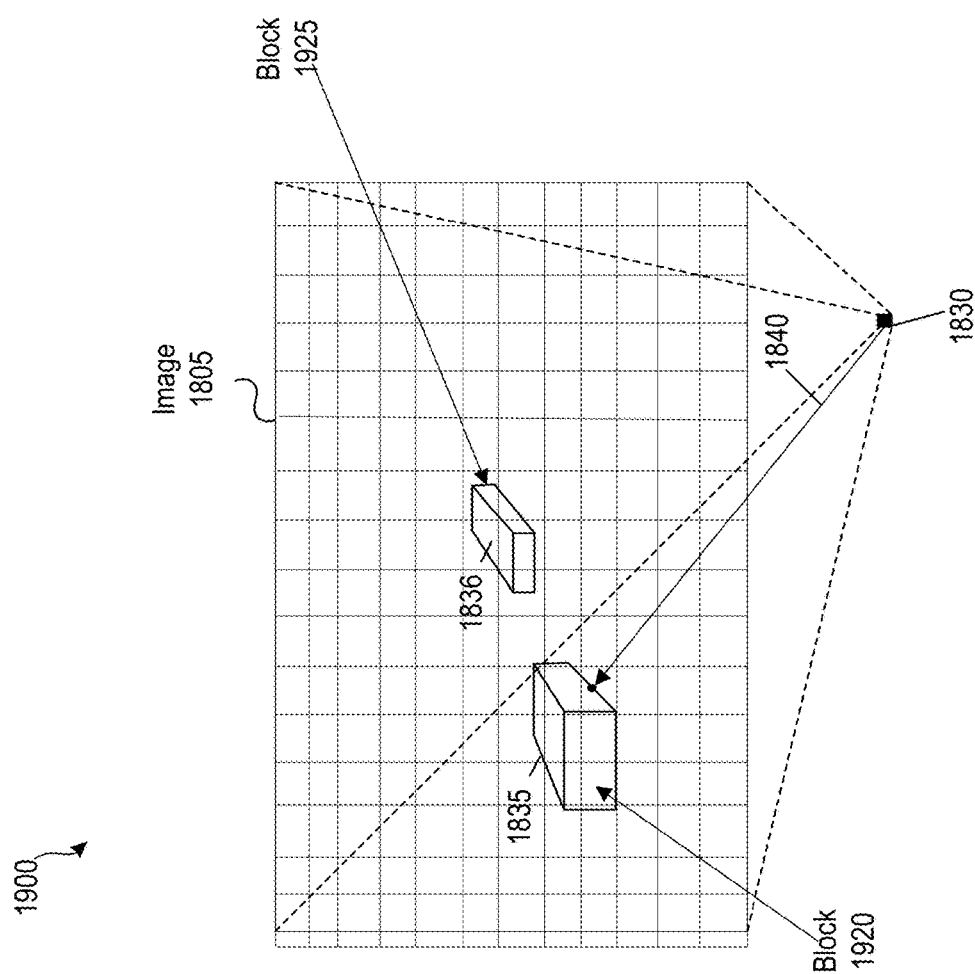
FIG. 19 depicts an example of partitioning a rendered image of the AR scene into a plurality of blocks.

Based on the relative depth information associated with the AR scene, the image rendering application 725 may determine a depth map for the image 1805 from the perspective of the virtual camera 1830. The image rendering application 725 may partition or divide the bitmap for the image 1805 and its corresponding depth map into a plurality of blocks. FIG. 19 shows an example of the image 1805 partitioned into a plurality of blocks. The image rendering application 725 may determine an average depth for each block. The average depth may be determined based on the relative depth information associated with the first and second AR objects 1535. Each block of the depth map may comprise the average depth determined for its corresponding block in the image 1805. As shown in FIG. 19, block 1920 of the image 1805 is much closer to the virtual camera 1830 than block 1925. Thus, the average depth determined for the portion of the first AR object 1835 within the block 1920 may be smaller than the average depth determined for the portion of the second AR object 1835 within the block 1925.

Figure 20:
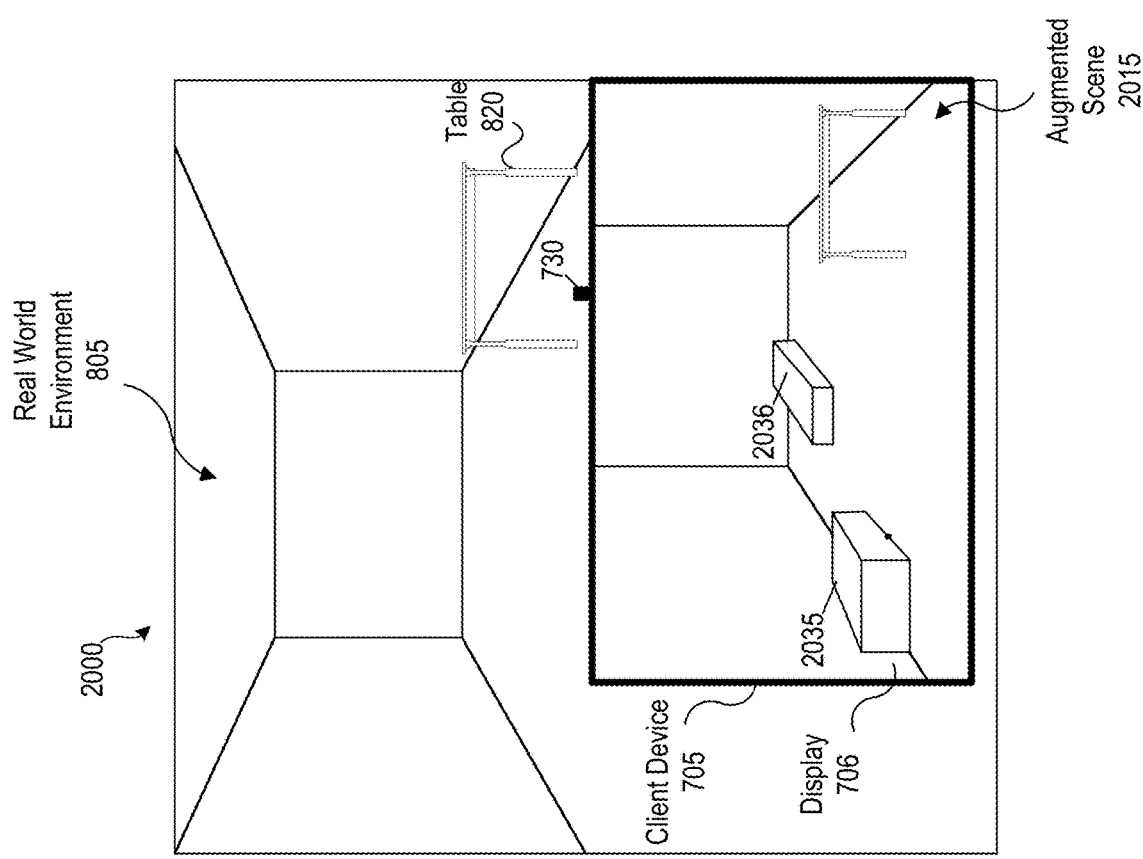
FIG. 20 depicts an example of an augmented scene that includes the AR scene.

The image rendering application 725 may determine a compression factor for each block of the image 1805 based on its average depth. For example, the value of the compression factor for the block 1920 may be selected as 0.9 while the value of the compression factor for the block 1925 may be selected as 0.2. The image rendering application 725 may compress the pixels of the first AR object 1835 corresponding to each block of the image 1805 based on the compression factor determined for that block. For example, pixels of the first AR object 1835 corresponding to or within the block 1920 may be compressed based on applying a compression factor of 0.9 and the pixels of the second AR object 1836 corresponding to or within the block 1925 may be compressed by applying a compression factor of 0.2. Additionally, the image rendering application 725 may compress the pixels of the image 1805 not corresponding to the first or second AR objects 1835 or 1836 based on a different compression factor, for example, a default compression factor. The default compression factor may be different from the compression factors that are selected for the blocks of the image 1805 comprising the first and second AR object 1835 and 1836. The final bitmap may comprise the compressed bitmaps for the blocks of the image 1805. The compressed image 1805 may comprise a sequence of masked images or streaming bitmaps and may be sent from the server 710 to the client device 705. The client device 705 may receive the sequence of masked images or streaming bitmaps from the server 710 and overlay them on to the real world scene 1815. FIG. 20 shows an example of an augmented scene 2015 based on overlaying a rendered AR scene, comprising the rendered first and second AR objects 2035 and 2036, on to the real world scene 1815 shown in FIG. 18.

Figure 21:
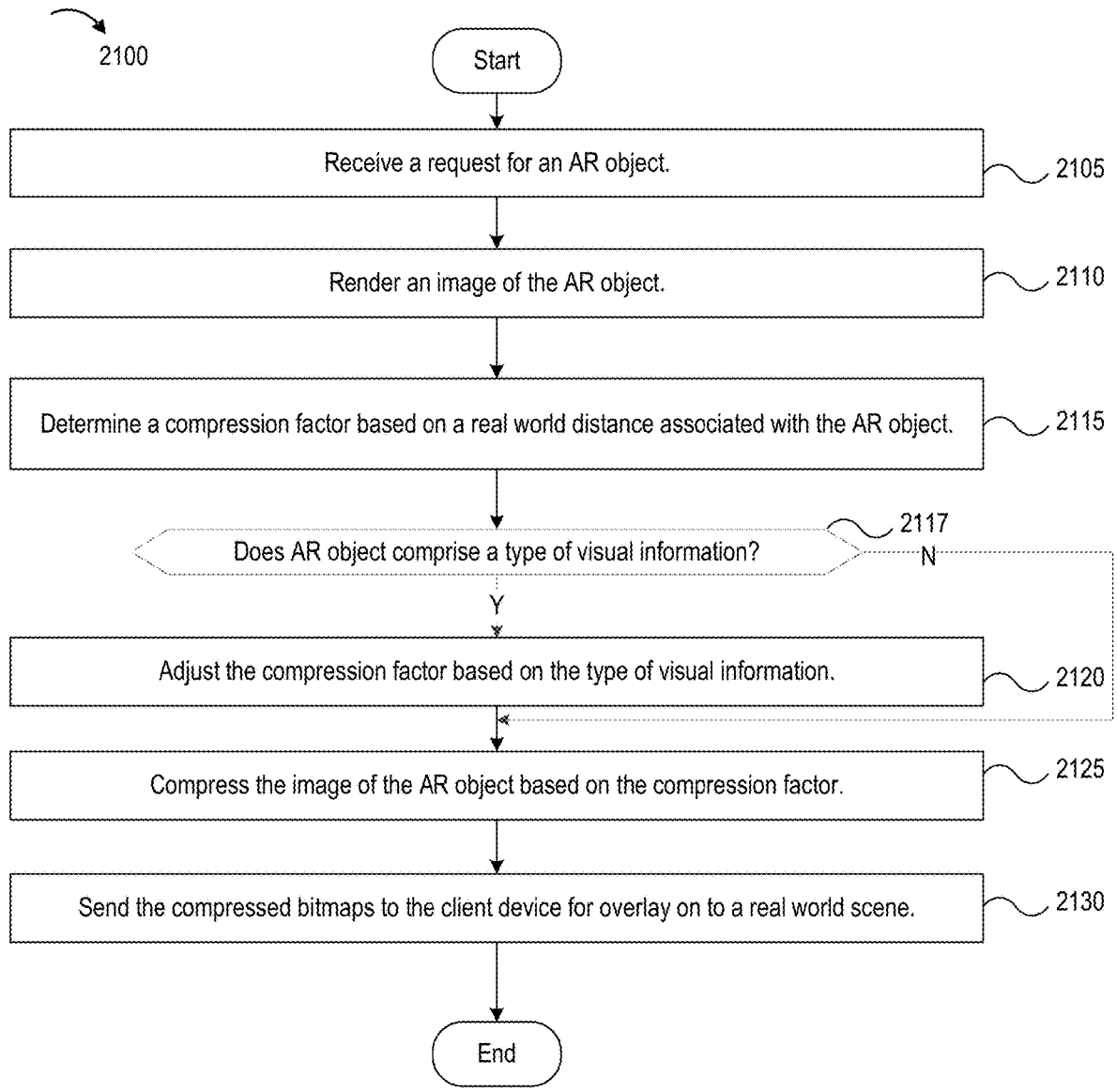
FIG. 21 is a flow diagram of an example method for performing image compression of AR content based on real world distance information.

FIG. 21 shows a flow diagram of an example method 2100 for image compression of streaming AR content based on real world distance information. The steps of the method 2100 may be performed by the server 710 of the system 700 shown in FIG. 7. Alternatively or additionally, some or all of the steps of the method 2100 may be performed by one or more other computing devices. Steps of the method 2100 may be modified, omitted, and/or performed in other orders, and/or other steps added.

As described with reference to FIG. 7, the client device 705 may be configured to facilitate real time interaction by a user with a virtual world. FIG. 13 shows an example of an intended placement, via the client device 705, of an AR browser window object 1335 and an example rendering of the AR browser window object 1335 at the server 710. The intended placement of the AR browser window object 1335 within the real world scene 1315 may correspond to a real world location 1322 within the real world environment 805. The AR application 720 may generate a request for a rendering of the AR browser window object 1335. The request may comprise a measurement of a real world distance 1340 between the client device 705 and the real world location 1322. The request may be sent from the client device 705 to the server 710 over the network 140.

At step 2105 of the method 2100, the server 710 may receive the request to render the AR browser window object 1335. At step 2110 of the method 2100, the server 710 may render the AR browser window object 1335 from the perspective of a virtual camera 1330. The perspective of the virtual camera 1330 may generally correspond to the perspective of the camera 730 of the client device 705. The image rendering application 725 may render one or more images of the AR browser window object 1335, such as the image 1305 shown in FIG. 13. The image 1305 may comprise a bitmap or spatially mapped array of pixels.

At step 2115 of the method 2100, the server 710 may determine a compression factor for the AR browser window object 1335. Referring back to FIG. 12, the placement of the AR browser window object 1335 is at least as far away from the client device 705 as the placement of the second AR object 1135 shown in FIG. 12. As an example, the real world distance 1340 corresponding to the intended placement of the AR browser window object 1335 may be 21 meters. Based on the criteria shown in Table 1 above, the value of the compression factor may be selected as 0.2.

At step 2117 of the method 2100, the server 710 may determine whether one or more portions of the AR browser window object 1335 comprise visual information. As discussed above, at least a portion of the AR browser window object 1335, such as the portion 1336, may comprise textual or other visual information that the user is likely to be interested in reading regardless of how far away the user is from the AR browser window object 1335. Thus, the desired fidelity for the AR browser window object 1335 may be higher than the fidelity resulting from a compression based on the compression factor of 0.2. Based on a determination that one or more portions of the AR browser window object 1335 comprise visual information, the server 710 may proceed to step 2120 of the method 2100 and may adjust the compression factor determined for the AR browser window object 1335. However, based on a determination that one or more portions of the AR browser window object 1335 do not comprise visual information, the server 710 may proceed to step 2125 of the method 2100 and compress the image of the AR browser window object 1335 based on the determined compression factor.

At step 2120 of the method 2100, the server 710 may adjust the compression factor determined for the AR browser window object 1335. The compression factor may be adjusted based on the visual information associated with the AR browser window object 1335. For example, the server 710 may determine an adjusted compression factor of 0.9 for at least the portion 1336 of the AR browser window object 1335.

At step 2125 of the method 2100, the server 710 may compress the pixels of the image 1305 corresponding to the portion 1336 of the AR browser window object 1335 based on the compression factor of 0.9, and compress the pixels of the image 1305 corresponding to the AR browser window object 1335 not including the portion 1336 based on the compression factor of 0.2. Additionally, the portion of the image 1305 not corresponding to the AR browser window object 1335 (including the portion 1336) may be compressed according to a different compression factor, such as default compression factor. The compressed AR browser window object 1335 may comprise a sequence of masked images or streaming bitmaps.

At step 2130 of the method 2100, the server 710 may send the sequence of masked images or streaming bitmaps to the client device 705. The client device 705 may overlay the images or bitmaps on to the real world scene 1315. FIG. 14 shows an example of an augmented scene 1415 based on overlaying a rendering of the AR browser window object 1435 on to the real world scene 1315 shown in FIG. 13.

Figure 22:
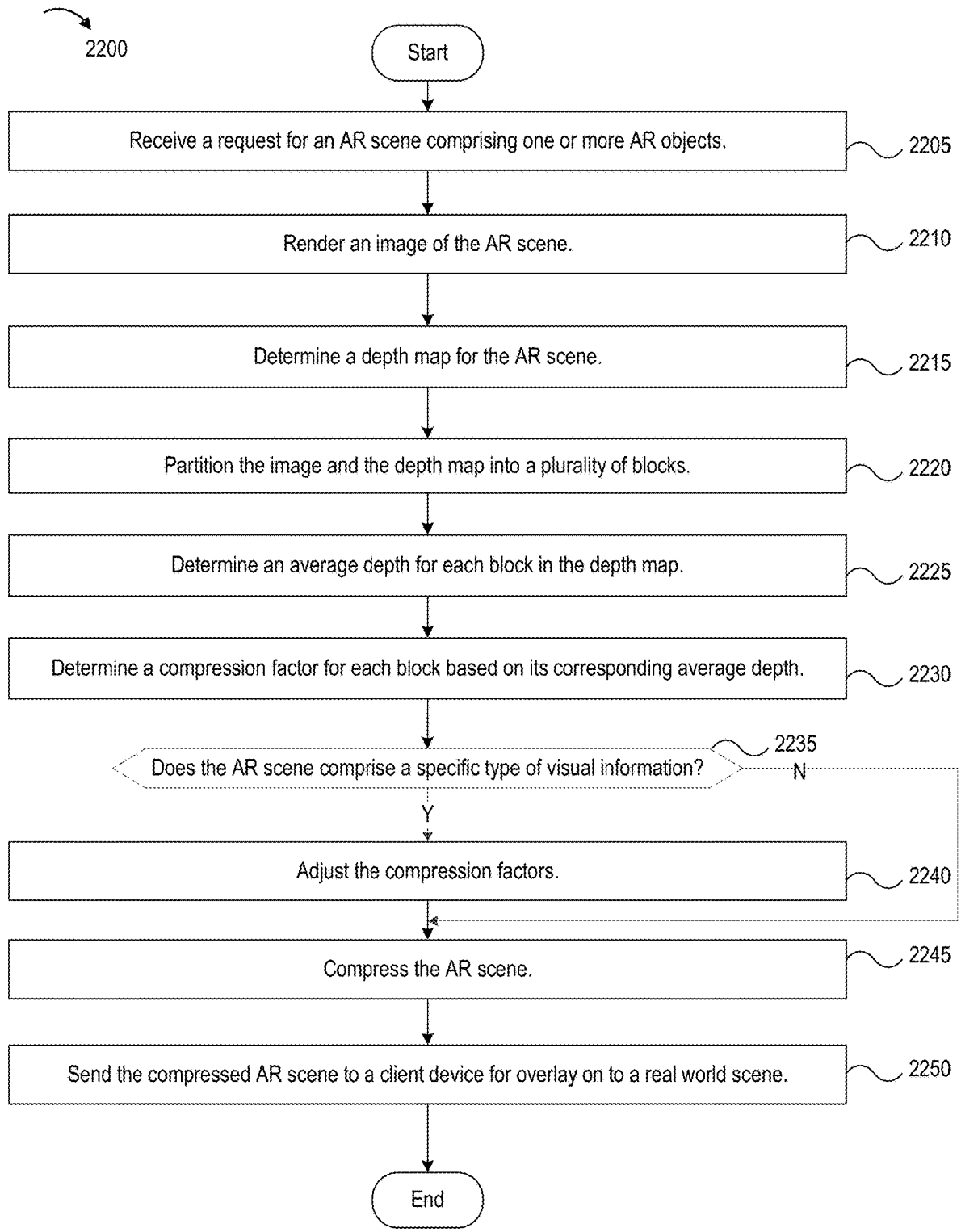
FIG. 22 is a flow diagram of an example method for performing image compression of AR content based on relative depth information.

FIG. 22 shows a flow diagram of an example method 2200 for image compression of streaming AR content based on relative depth information. The steps of the method 2100 may be performed by the server 710 of the system 700 shown in FIG. 7. Alternatively or additionally, some or all of the steps of the method 2200 may be performed by one or more other computing devices. Steps of the method 2200 may be modified, omitted, and/or performed in other orders, and/or other steps added.

FIG. 18 shows an example of an intended placement, via the client device 705, of an AR scene comprising a first AR object 1835 and a second AR object 1836 and an example rendering of the AR scene at the server 710. The intended placement of the AR scene within the real world scene 1815 may correspond to a real world location 1822 within the real world environment 805. The AR application 720 may generate a request for a rendering of the AR scene. The request may comprise a measurement of a real world distance 1840 between the client device 705 and the real world location 1822. The request may be sent from the client device 705 to the server 710 over the network 140.

At step 2205 of the method 2200, the server 710 may receive the request for the AR scene. At step 2210 of the method 2200, the server 710 may render one or more images for the AR scene, such as image 1805, from the perspective of a virtual camera 1830. The perspective of the virtual camera 1830 may generally correspond to the perspective of the camera 730 of the client device 705. The image 1805 may comprise a bitmap or spatially mapped array of pixels.

At step 2215 of the method 2200, the server 710 may determine depth information for the first and second AR objects 1835 and 1836 relative to an absolute depth associated with the AR scene. As an example, the absolute depth for the AR scene may be the real world distance 1840. The depth information for the first and second AR object 1835 and 1836 relative to the real world distance 1840 may be determined based on their respective 3D models in the 3D object database 730. As shown in FIG. 18, the depth of the first AR object 1535 from the real world location 1822 and towards the client device 705 is 2 meters. The depth of the first AR object 1835 from the real world location 1522 and away from the client device 705 is also 2 meters. The relative depth information for the second AR object 1836 may be based on its distance in the z direction from the first AR object 1835, shown in FIG. 18 as 5 meters. Additionally, the depth of the second AR object 1836 is 4 meters.

At step 2220 of the method 2200, the server 710 may determine a depth map for the image 1805 from the perspective of the virtual camera 1830. At step 2225 of the method 2200, the server 710 may partition or divide the bitmap for the image 1805 and its corresponding depth map into a plurality of blocks. FIG. 19 shows an example of the image 1805 partitioned into a plurality of blocks. The image rendering application 725 may determine an average depth for each block. The average depth may be determined based on the relative depth information associated with the first and second AR objects 1535. Each block of the depth map may comprise the average depth determined for its corresponding block in the image 1805. As shown in FIG. 19, block 1920 of the image 1805 is much closer to the virtual camera 1830 than block 1925. Thus, the average depth determined for the portion of the first AR object 1835 within the block 1920 may be smaller than the average depth determined for the portion of the second AR object 1835 within the block 1925.

At step 2230 of the method 2200, the server 710 may determine a compression factor for each block of the image 1805 based on its average depth. For example, the value of the compression factor for the block 1920 may be selected as 0.9 while the value of the compression factor for the block 1925 may be selected as 0.2.

At step 2235 of the method 2200, the server 710 may determine whether one or more portions of the image 1805 or one or more blocks of the image 1805 comprise visual information. At step 2240 of the method 2200, the server 710 may be based on a determination that one or more blocks of the image 1805 are associated with a specific type of visual information, adjust the compression factors for those blocks of the image 1805. The adjusted compression factors may be based on the visual information associated with the AR content within the block.

At step 2240 of the method 220, the server 710 may compress the pixels of the first AR object 1835 corresponding to each block of the image 1805 based on the compression factor determined for that block. For example, pixels of the first AR object 1835 corresponding to or within the block 1920 may be compressed based on applying a compression factor of 0.9 and the pixels of the second AR object 1836 corresponding to or within the block 1925 may be compressed by applying a compression factor of 0.2. Additionally, server 710 may compress the pixels of the image 1805 not corresponding to the first or second AR objects 1835 or 1836 based on a different compression factor, for example, a default compression factor. The default compression factor may be different from the compression factors that are selected for the blocks of the image 1805 comprising the first and second AR object 1835 and 1836. The final bitmap may comprise the compressed bitmaps for the blocks of the image 1805. The compressed image 1805 may comprise a sequence of masked images or streaming bitmaps.

At step 2250 of the method 2200, the server 710 send the compressed AR scene to the client device 705. The client device 705 may overlay the compressed AR scene on to a real world scene. FIG. 20 shows an example of an augmented scene 2015 based on overlaying a rendered AR scene, comprising the rendered first and second AR objects 2035 and 2036, on to the real world scene 1815 shown in FIG. 18.

The following paragraphs M1 through M8 describe examples of methods that may be implemented in accordance with the present disclosure.

(M1) A method comprising receiving, by a server, a request for a rendered image of augmented reality (AR) content. The AR content comprises a first AR object and the request comprises a real world distance between a client device and a real world location corresponding to an intended placement location of the first AR object within a real world scene captured by the client device. The method includes rendering, by the server and based on receiving the request, an image corresponding to the AR content. The one or more portions of the image correspond to the first AR object. The method includes selecting, by the server, a first compression factor for the first AR object. The first compression factor is selected from a plurality of compression factors based on the real world distance between the client device and the real world location corresponding to the intended placement location of the first AR object. The method includes compressing, by the server, the image corresponding to the AR content, wherein the one or more portions of the image corresponding to the first AR object are compressed based on the first compression factor. The method includes sending, by the server, the compressed image corresponding to the AR content for delivery to the client device.

(M2) The method described in paragraph (M1), wherein the one or more portions of the image corresponding to the first AR object are rendered from a perspective of a virtual camera.

(M3) The method as described in any of paragraphs (M1) through (M2) wherein the first compression factor is selected based on a type of visual information associated with at least a portion of the first AR object.

(M4) The method as described in paragraph (M3), wherein the type of visual information comprises at least one of text or alphanumeric characters.

(M5) The method as described in any of paragraphs (M1) through (M4), wherein selecting the first compression factor comprises determining whether the real world distance exceeds at least one threshold distance.

(M6) The method as described in any of paragraphs (M1) through (M5), further comprising determining, by the server and based on the real world distance between the client device and the real world location, a relative depth for the one or more portions of the image corresponding to the first AR object, wherein selecting the first compression factor for the first AR object comprises selecting, for each of the one or more portions of the image corresponding to the first AR object, one of the plurality of compression factors based on the relative depth determined for the portion, and wherein each portion of the image corresponding to the first AR object is compressed based on the compression factor selected for the portion.

(M7) The method as described in any of paragraphs (M1) through (M6), wherein the AR content comprises the first AR object and a second AR object, and wherein determining the relative depth for at least one of the one or more portions of the image corresponding to the first AR object is based on at least one real world distance between the first AR object and the second AR object.

(M8) The method as described in any of paragraphs (M6) and (M7), wherein selecting the compression factor for a portion of the image corresponding to the first AR object comprises determining that a value of the compression factor is $10/(e^x)$, wherein x is the relative depth determined for the portion.

The following paragraphs (A1) through (A8) describe examples of apparatuses that may be implemented in accordance with the present disclosure.

(A1) An apparatus may comprise one or more processors, and a memory storing computer-readable instructions that, when executed by the one or more processors, configure the one or more processors to receive a request for a rendered image of augmented reality (AR) content, wherein the AR content comprises a first AR object and the request comprises a real world distance between a client device and a real world location corresponding to an intended placement location of the first AR object within a real world scene captured by the client device, render, based on receiving the request, an image corresponding to the AR content, wherein one or more portions of the image correspond to the first AR object, select a first compression factor for the first AR object, wherein the first compression factor is selected from a plurality of compression factors based on the real world distance between the client device and the real world location corresponding to the intended placement location of the at least one AR object, compress the image corresponding to the AR content, wherein the one or more portions of the image corresponding to the first AR object are compressed based on the first compression factor, and send the compressed image corresponding to the AR content for delivery to the client device.

(A2) The apparatus as described in paragraph (A1), wherein the one or more portions of the image corresponding to the first AR object are rendered from a perspective of a virtual camera.

(A3) The apparatus as described in any of paragraphs (A1) through (A2), wherein the first compression factor is selected based on a type of visual information associated with at least a portion of the first AR object.

(A4) The apparatus as described in paragraph (A3) wherein the type of visual information comprises at least one of text or alphanumeric characters.

(A5) The apparatus as described in any of paragraphs (A1) through (4) wherein selecting the first compression factor comprises determining whether the real world distance exceeds at least one threshold distance.

(A6) The apparatus as described in any of paragraphs (A1) through (A5), wherein the computer-readable instructions, when executed by the one or more processors, further configure the one or more processors to determine, based on the real world distance between the client device and the real world location, relative depth information for the one or more portions of the image corresponding to the first AR object, wherein selecting the first compression factor for the first AR object comprises selecting, for each of the one or more portions of the image corresponding to the first AR object, one of the plurality of compression factors based on the relative depth information determined for the portion, and wherein each portion of the image corresponding to the first AR object is compressed based on the compression factor selected for the portion.

(A7) The apparatus as described in any of paragraphs (A1) through (A6), wherein the AR content comprises the first AR object and a second AR object, and wherein determining the relative depth information for the one or more portions of the image corresponding to the first AR object is based on the real world distance between the client device and the real world location of the intended placement location of the first AR object within the real world scene, and a real world distance between the first AR object and the second AR object.

(A7) The apparatus as described in paragraphs (A1) through (A7), wherein selecting the compression factor comprises determining that a value of the at least one compression factor is $10/(e\hat{\ }x)$, wherein x is the real world distance between the client device and the real world location.

The following paragraphs (CRM1) through (CRM8) describe examples of computer-readable media that may be implemented in accordance with the present disclosure.

(CRM1) A non-transitory computer-readable medium storing instructions that, when executed, cause a system to perform a method comprising receiving, by a server, a request for a rendered image of augmented reality (AR) content. The AR content comprises a first AR object and the request comprises a real world distance between a client device and a real world location corresponding to an intended placement location of the first AR object within a real world scene captured by the client device. The method includes rendering, by the server and based on receiving the request, an image corresponding to the AR content. The one or more portions of the image correspond to the first AR object. The method includes selecting, by the server, a first compression factor for the first AR object. The first compression factor is selected from a plurality of compression factors based on the real world distance between the client device and the real world location corresponding to the intended placement location of the first AR object. The method includes compressing, by the server, the image corresponding to the AR content, wherein the one or more portions of the image corresponding to the first AR object are compressed based on the first compression factor. The method includes sending, by the server, the compressed image corresponding to the AR content for delivery to the client device.

(CRM2) The non-transitory computer-readable medium as described in paragraph (CRM1), wherein the one or more portions of the image corresponding to the first AR object are rendered from a perspective of a virtual camera.

(CRM3) The non-transitory computer-readable medium as described in any of paragraphs (CRM1) through (CRM2) wherein the first compression factor is selected based on a type of visual information associated with at least a portion of the first AR object.

(CRM4) The non-transitory computer-readable medium as described in paragraph (CRM3), wherein the type of visual information comprises at least one of text or alphanumeric characters.

(CRM5) The non-transitory computer-readable medium as described in any of paragraphs (CRM1) through (CRM4), wherein selecting the first compression factor comprises determining whether the real world distance exceeds at least one threshold distance.

(CRM6) The non-transitory computer-readable medium as described in any of paragraphs (CRM1) through (CRM5), further comprising determining, by the server and based on the real world distance between the client device and the real world location, a relative depth for the one or more portions of the image corresponding to the first AR object, wherein selecting the first compression factor for the first AR object comprises selecting, for each of the one or more portions of the image corresponding to the first AR object, one of the plurality of compression factors based on the relative depth determined for the portion, and wherein each portion of the image corresponding to the first AR object is compressed based on the compression factor selected for the portion.

(CRM7) The non-transitory computer-readable medium as described in any of paragraphs (CRM1) through (CRM6), wherein the AR content comprises the first AR object and a second AR object, and wherein determining the relative depth for at least one of the one or more portions of the image corresponding to the first AR object is based on at least one real world distance between the first AR object and the second AR object.

(CRM8) The non-transitory computer-readable medium as described in any of paragraphs (CRM6) and (CRM7), wherein selecting the compression factor for a portion of the image corresponding to the first AR object comprises determining that a value of the compression factor is $10/(e\hat{\ }x)$, wherein x is the relative depth determined for the portion.

The following paragraphs M9 through M12 describe examples of methods that may be implemented in accordance with the present disclosure.

(M9) A method may be performed comprising receiving, by a server, a request for a rendered image of an AR scene comprising one or more AR objects, wherein the request comprises a real world distance between a client device and an intended placement location of the AR scene within a real world scene captured by a client device, rendering, by the server and based on receiving the request, an image of the AR scene, determining, by the server and based on a real world distance between a client device and an intended placement location of the AR scene, relative depth information for one or more portions of the one or more AR objects, determining, by the server and based on the relative depth information for the one or more AR objects, an average depth for one or more portions of the image, selecting, by the server, one of a plurality of compression factors for each of the one or more portions of the image based on the average depth determined for the portion, compressing, by the server, the image of the AR scene, wherein the one or more portions of the image are each compressed based on the compression factor selected for the portion, and sending, by the server, the compressed image of the AR scene for delivery to the client device.

(M10) The method as described in paragraph (M9) wherein the relative depth information comprises an average depth for each of the one or more portions of the image of the AR scene, and a compression factor for a portion of the image of the AR scene is based on the average depth for the portion.

(M11) The method as described in any of paragraphs (M9) through (M10), wherein at least one compression factor is determined based on a type of visual information associated with at least a portion of the one or more AR objects.

(M12) The method as described in any of paragraphs (M9) through (M11), wherein the type of visual information comprises at least one of text or alphanumeric characters.

The following paragraphs (A9) through (A12) describe examples of apparatuses that may be implemented in accordance with the present disclosure.

(A9) An apparatus may comprise one or more processors, and a memory storing computer-readable instructions that, when executed by the one or more processors, configure the one or more processors to receive a request for a rendered image of an AR scene comprising one or more AR objects, wherein the request comprises a real world distance between a client device and an intended placement location of the AR scene within a real world scene captured by a client device, render, based on receiving the request, an image of the AR scene, determine, based on a real world distance between a client device and an intended placement location of the AR scene, relative depth information for one or more portions of the one or more AR objects, determine, based on the relative depth information for the one or more AR objects, an average depth for one or more portions of the image, select, based on one of a plurality of compression factors for each of the one or more portions of the image based on the average depth determined for the portion, compressing, by the server, the image of the AR scene, wherein the one or more portions of the image are each compressed based on the compression factor selected for the portion, and send, the compressed image of the AR scene for delivery to the client device.

(A10) The apparatus as described in paragraph (A9) wherein the relative depth information comprises an average depth for each of the one or more portions of the image of the AR scene, and a compression factor for a portion of the image of the AR scene is based on the average depth for the portion.

(A11) The apparatus as described in any of paragraphs (A9) through (A10), wherein at least one compression factor is determined based on a type of visual information associated with at least a portion of the one or more AR objects.

(A12) The apparatus as described in any of paragraphs (A9) through (A11), wherein the type of visual information comprises at least one of text or alphanumeric characters.

The following paragraphs (CRM9) through (CRM12) describe examples of computer-readable media that may be implemented in accordance with the present disclosure.

(CRM9) A non-transitory computer-readable medium storing instructions that, when executed, cause a system to perform a method (CRM10) The non-transitory computer-readable medium as described in paragraph (M9) wherein the relative depth information comprises an average depth for each of the one or more portions of the image of the AR scene, and a compression factor for a portion of the image of the AR scene is based on the average depth for the portion.

(CRM11) The non-transitory computer-readable medium as described in any of paragraphs (CRM9) through (CRM10), wherein at least one compression factor is determined based on a type of visual information associated with at least a portion of the one or more AR objects.

(CRM12) The non-transitory computer-readable medium as described in any of paragraphs (CRM9) through (CRM11), wherein the type of visual information comprises at least one of text or alphanumeric characters.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

The invention claimed is:

1. A method comprising:
    receiving, by a server, a first request for a first image of augmented reality (AR) content, wherein the AR content comprises a first AR object and the request comprises a first real world distance between a client device and a real world location corresponding to an intended placement location, of the first AR object, within a real world scene captured by the client device;
    rendering, by the server and based on receiving the request, a first image of AR content, wherein one or more portions of the first image comprise the first AR object;
    selecting, by the server, a first compression factor for the first AR object, wherein the first compression factor is selected from a plurality of compression factors based on the first real world distance between the client device and the real world location corresponding to the intended placement location of the first AR object;
    generating, by the server and based on the rendered first image, first compressed image of AR content, wherein one or more portions of the first compressed image comprising the first AR object are compressed based on the first compression factor;
    sending, by the server, the first compressed image of AR content for delivery to the client device such that, when displayed by the client device the first AR object appears at the intended placement location;
    receiving, by the server and after sending the first compressed image, a second request for a second image of AR content comprising the first AR object, wherein the second request comprises a second real world distance between the client device and the real world location, and wherein the second distance is different from the first distance;
    rendering, by the server and based on receiving the second request, the second image of AR content, wherein one or more portions of the image comprise the first AR object;
    selecting, by the server, a second compression factor, different from the first compression factor, for the first AR object, wherein the second compression factor is selected from the plurality of compression factors based on the second distance;
    generating, by the server and based on the rendered second compressed image, the second compressed image of AR content, wherein one or more portions of the second compressed image comprising the first AR object are compressed based on the second compression factor;
    sending, by the server, the second compressed image of AR content for delivery to the client device such that, when displayed by the client device the first AR object appears at the intended placement location; and
    determining, by the server and based on the first real world distance between the client device and the real world location, a relative depth for the one or more portions of the first image comprising the first AR object,
    wherein selecting the first compression factor for the first AR object comprises selecting, for each of the one or more portions of the first image comprising the first AR object, one of the plurality of compression factors based on the relative depth determined for the portion, each portion of the first compressed image comprising the first AR object is compressed based on the compression factor selected for the portion, and
    wherein the AR content comprises the first AR object and a second AR object, and wherein determining the relative depth for at least one of the one or more portions of the first image comprising the first AR object is based on at least one real world distance between the first AR object and the second AR object.

2. The method of claim 1, wherein the first compression factor is selected based on a type of visual information associated with at least a portion of the first AR object.

3. The method of claim 2, wherein the type of visual information comprises at least one of text or alphanumeric characters.

4. The method of claim 1, wherein selecting the first compression factor is further based on:
    a fidelity, of the one or more portions of the first image comprising the first AR object, being higher than a desired fidelity of the one or more portions.

5. The method of claim 1, wherein selecting the compression factor for a portion of the first image comprising the first AR object comprises:
  determining that a value of the compression factor is $10/(e^x)$, wherein x is the relative depth determined for the portion.

6. A system comprising:
  one or more processors; and
  a memory storing computer-readable instructions that, when executed by the one or more processors, configure the one or more processors to:
    receive a first request for a first image of augmented reality (AR) content, wherein the AR content comprises a first AR object and the request comprises a first real world distance between a client device and a real world location corresponding to an intended placement location, of the first AR object, within a real world scene captured by the client device;
    render, based on receiving the request, a first image of AR content, wherein one or more portions of the first image comprise the first AR object;
    select a first compression factor for the first AR object, wherein the first compression factor is selected from a plurality of compression factors based on the first real world distance between the client device and the real world location corresponding to the intended placement location of the first AR object;
    generate, based on the rendered first image, the first compressed image of AR content, wherein one or more portions of the first compressed image comprising the first AR object are compressed based on the first compression factor; and
    send the first compressed image of AR content for delivery to the client device such that, when displayed by the client device the first AR object appears at the intended placement location;
    receive, after sending the first compressed image, a second request for a second image of AR content comprising the first AR object, wherein the second request comprises a second real world distance between the client device and the real world location, and wherein the second distance is different from the first distance;
    render, based on receiving the second request, the second image of AR content, wherein one or more portions of the image comprise the first AR object;
    select a second compression factor, different from the first compression factor, for the first AR object, wherein the second compression factor is selected from the plurality of compression factors based on the second distance;
    generate, based on the rendered second image, the second compressed image of AR content, wherein one or more portions of the second compressed image comprising the first AR object are compressed based on the second compression factor;
    send the second compressed image of AR content for delivery to the client device such that, when displayed by the client device the first AR object appears at the intended placement location; and
    determine, based on the first real world distance between the client device and the real world location, relative depth information for the one or more portions of the first image comprising the first AR object,
    wherein selecting the first compression factor for the first AR object comprises selecting, for each of the one or more portions of the first image comprising the first AR object, one of the plurality of compression factors based on the relative depth information determined for the portion,
    wherein each portion of the first compressed image comprising the first AR object is compressed based on the compression factor selected for the portion,
    wherein the AR content comprises the first AR object and a second AR object,
    wherein determining the relative depth information for the one or more portions of the first image comprising the first AR object is based on the first real world distance between the client device and the real world location of the intended placement location of the first AR object within the real world scene, and a real world distance between the first AR object and the second AR object.

7. The system of claim 6, wherein the first compression factor is selected based on a type of visual information associated with at least a portion of the first AR object.

8. The system of claim 7, wherein the type of visual information comprises at least one of text or alphanumeric characters.

9. The system of claim 6, wherein selecting the first compression factor is further based on a fidelity, of the one or more portions of the first image comprising the first AR object, is higher than a desired fidelity of the one or more portions.

10. The system of claim 6, wherein selecting the compression factor comprises:
  determining that a value of the at least one compression factor is $10/(e^x)$, wherein x is the first real world distance between the client device and the real world location.

11. A method comprising:
  receiving, by a server, a first request for a first image of an AR scene comprising one or more AR objects, wherein the request comprises a first real world distance between a client device and an intended placement location, of the AR scene, within a real world scene captured by a client device;
  rendering, by the server and based on receiving the request, a first image of the AR scene comprising the one or more AR objects;
  determining, by the server and based on the first real world distance between the client device and the intended placement location of the AR scene, relative depth information for one or more portions of the one or more AR objects;
  determining, by the server and based on the relative depth information for the one or more AR objects, an average depth for one or more portions of the image;
  selecting, by the server, one of a plurality of compression factors for each of the one or more portions of the image based on the average depth determined for the portion;
  generating, by the server and based on the rendered first image, the first compressed image of the AR scene comprising the one or more AR objects, wherein one or more portions of the first compressed image are each compressed based on the compression factor selected for the portion; and
  sending, by the server, the first compressed image of the AR scene comprising the one or more AR objects for delivery to the client device such that, when displayed by the client device the first AR object appears at the intended placement location;
  receiving, by the server and after sending the first compressed image, a second request for a second image of AR content comprising the first AR object, wherein the second request comprises a second real world distance between the client device and the real world location, and wherein the second distance is different from the first distance;

rendering, by the server and based on receiving the second request, the second image of AR content, wherein one or more portions of the image comprise the first AR object;

selecting, by the server, a second compression factor, different from the first compression factor, for the first AR object, wherein the second compression factor is selected from the plurality of compression factors based on the second distance;

generating, by the server and based on the rendered second image, the second compressed image of AR content, wherein one or more portions of the second compressed image comprising the first AR object are compressed based on the second compression factor;

sending, by the server, the second compressed image of AR content for delivery to the client device such that, when displayed by the client device the first AR object appears at the intended placement location; and wherein the AR scene comprises the first AR object and a second AR object, and wherein determining the relative depth for at least one of the one or more portions of the first image comprising the first AR object is based on at least one real world distance between the first AR object and the second AR object.

12. The method of claim 11, wherein the relative depth information comprises an average depth for each of the one or more portions of the image of the AR scene, and a compression factor for a portion of the image of the AR scene is based on the average depth for the portion.

13. The method of claim 11, wherein at least one compression factor is determined based on a type of visual information associated with at least a portion of the one or more AR objects.

14. The method of claim 13, wherein the type of visual information comprises at least one of text or alphanumeric characters.

15. The method of claim 1, wherein the one or more portions of the first compressed image has a lower fidelity than a model of the first AR object stored in a database associated with the server.

* * * * *